(12) United States Patent
Govindarajan et al.

(10) Patent No.: US 7,702,687 B2
(45) Date of Patent: Apr. 20, 2010

(54) METHOD AND SYSTEM OF TYPING RESOURCES IN A DISTRIBUTED SYSTEM

(75) Inventors: Kannan Govindarajan, Fremont, CA (US); Sekhar R. Sarukkai, Sunnyvale, CA (US); Shamik Shama, Sunnyvale, CA (US); Shankar Umamaheshwaran, Santa Clara, CA (US); Arindam Banerji, Sunnyvale, CA (US); Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1358 days.

(21) Appl. No.: 11/141,839

(22) Filed: Jun. 1, 2005

(65) Prior Publication Data

US 2005/0240651 A1 Oct. 27, 2005

(51) Int. Cl.
*G06F 7/00* (2006.01)
(52) U.S. Cl. .............. 707/770; 707/769; 709/200; 709/217; 709/219
(58) Field of Classification Search .............. 707/2, 707/3, 102, 6; 709/217, 219, 200
See application file for complete search history.

(56) References Cited

U.S. PATENT DOCUMENTS

| | | | |
|---|---|---|---|
| 5,418,957 A | 5/1995 | Narayan | |
| 5,432,930 A | 7/1995 | Song et al. | |
| 5,806,060 A | 9/1998 | Borgida et al. | |
| 5,864,856 A | 1/1999 | Young | |
| 6,076,088 A | 6/2000 | Paik et al. | |
| 6,112,181 A | 8/2000 | Shear et al. | |
| 6,125,383 A | 9/2000 | Glynias et al. | |
| 6,151,624 A | 11/2000 | Teare et al. | |
| 6,418,448 B1 * | 7/2002 | Sarkar | 707/104.1 |
| 6,629,123 B1 | 9/2003 | Hunt | |
| 6,741,655 B1 | 5/2004 | Chang et al. | |

OTHER PUBLICATIONS

Inside OLE, Second edition, published by Microsoft Press, A Division of Microsoft Corporation One Microsoft Way, Redmond, Washington, Copyright @ 1995 by Kraig Brockschmidt, pp. 90, 95 and pp. 160-161.

* cited by examiner

*Primary Examiner*—Etienne P LeRoux
*Assistant Examiner*—Cindy Nguyen

(57) ABSTRACT

A system and method for typing resources in a distributed system is provided which enables flexible searching mechanisms for finding distributed resources. The distributed system includes at least three types of resources: service, vocabulary and contract resources. The service resource includes the implementation logic for the service. A contract resource contains interface data used for accessing resources. The vocabulary resource contains an attribute schema defining attributes used to describe resources. Each resource—including service, vocabulary and contract resources—is typed by associating one or more vocabulary resources and one or more contract resources with the resource. The vocabulary resources explain the meaning of attribute lists describing the resource and enable the resource to be discovered. The contract resources provide data for accessing the resource. Because vocabulary and contract resources are themselves resources, they are also typed by vocabulary and contract resources and are, accordingly, discoverable and accessible. Typing resources with vocabularies and contracts that are themselves discoverable resources, provides a structural mechanism for supporting robust resource discovery processes suitable for large, loosely-coupled distributed systems.

37 Claims, 17 Drawing Sheets

|           | 291           | 293           | 295                    | 297                              |
|-----------|---------------|---------------|------------------------|----------------------------------|
| Data type | Designator    | Matching rules | Operations                       |
| Big decimal | "BigDecimal" | eq, ne, lt, le, gt, ge | +, -, *, /              |
| Boolean   | "Boolean"     | eq, ne        | AND, OR                          |
| Byte      | "Byte"        | eq, ne        |                                  |
| Byte array | "ByteArray"  | eq, ne        |                                  |
| Char      | "Char"        | eq, ne        | + (concatenate, returns String)  |
| Date      | "Date"        | eq, ne, lt, le, gt, ge |                          |
| Double    | "Double"      | eq, ne, lt, le, gt, ge | +, -, *, /               |
| Float     | "Float"       | eq, ne, lt, le, gt, ge | +, -, *, /               |
| Int       | "Integer"     | eq, ne, lt, le, gt, ge | +, -, *, /               |
| Long      | "Long"        | eq, ne, lt, le, gt, ge | +, -, *, /               |
| Object    | "NamedObject" |               |                                  |
| Short     | "Short"       | eq, ne, lt, le, gt, ge | +, -, *, /               |
| String    | "String"      | eq, ne        | + (concatenate)                  |
| Time      | "Time"        | eq, ne, lt, le, gt, ge |                          |
| Time stamp | "Timestamp"  | eq, ne, lt, le, gt, ge |                          |

FIG. 8D

METHOD AND SYSTEM OF TYPING RESOURCES IN A DISTRIBUTED SYSTEM

CROSS REFERENCE TO RELATED APPLICATIONS

This application claims priority to U.S. patent application Ser. No. 09/733,012, filed Dec. 8, 2000, the disclosure of which (including all appendices) is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present disclosure relates to distributed system architectures, and particularly to systems and methods for typing distributed objects in a distributed object system.

2. Related Art

A "distributed system architecture" or "distributed system" as used herein is generally one in which the computer processes comprising the distributed system execute on different physical machines connected by a computer network. A "distributed process" as used herein is generally a computer process capable of executing in a distributed system. FIG. 1 is a block diagram illustrating a distributed system at the abstract level. In FIG. 1, process 9 executes on local computer 1 and consists of a sequence of four distributed sub-processes P1, P2, P3, P4. Sub-processes P1 and P3 execute locally (illustrated as processes A and B), and sub-processes P2 and P4 execute remotely. In this illustration, sub-process P4 executes entirely on remote computer 7 (illustrated as process D), whereas sub-process P2 consists of two further sub-processes, P2.1 19 executing on remote computer 3 (illustrated as process B1), and P2.2 21 executing on remote computer 5 (illustrated as process B2). In this illustration, therefore, execution of process 9 on local computer 1 requires local execution of two distributed sub-processes (P1 and P3) and remote execution of three sub-processes (P2.1, P2.2 and P4). Additionally, process 9 may itself constitute a distributed process if it is invocable as a sub-process by other remote processes.

A "distributed system infrastructure" or "distributed infrastructure" as used herein refers the program logic needed to support the functionalities of a distributed system architecture. For example, this may include program logic for establishing and maintaining a connection with a remote computer, marshalling data and instructions over a computer network to and from processes, and providing communication protocols, name translations, and access control measures. Another important functionality provided by modern distributed system architectures is location transparency or object virtualization. This functionality enables programmers or users to generally manipulate distributed processes in a single "logical space." Thus, for example, a programmer skilled in a particular programming language invokes processes regardless of physical location using the same familiar procedure calls provided by the programming language syntax applicable in the local address space; the infrastructure logic automatically provides the necessary remote procedure recognition, remote connections, data marshalling, and name translations needed for invoking the remote process.

A "distributed object system" is a distributed system in which the distributed processes are modeled programatically as objects. Modeling computational processes as objects is a well-known technique called object-oriented programming. In object-oriented programming, programmers encapsulate processes with associated data in relatively self-contained modules called classes, and create new processes and associated data by extending existing classes. A particular implementation of a class is called an object, and the processes implemented by the object are called methods. Methods in turn are exposed for use by other objects via interfaces which typically define the object and data types and sequences passed to and from the object. Objects are typically coded in object-oriented programming languages, such as Java or C++, which support the mechanisms giving object-oriented techniques advantages over traditional procedural coding techniques; these include the well-known advantages of, for example, data encapsulation, polymorphism, inheritance, and dynamic binding. In many distributed object systems, objects (or legacy applications) may be coded in a variety of programming languages (either object-oriented languages or procedural languages) employing different forms of programming language-specific interfaces. Thus, distributed systems often define a standard language for representing programming language-specific interfaces to the distributed infrastructure; distributed objects may therefore communicate with each other-via the standard interface language—called an "interface definition language" or "IDL"—even though they are coded in different programming languages. Programmers generally code IDL interfaces for objects directly in the IDL language, or use programming language-specific compilers to read objects and perform the necessary translations automatically. The "type" of a computation entity, such as a resource (as defined below), refers generally to the determinate set of properties belonging to the entity that are typically defined in reference to a determinate set operations performable by the entity or upon the entity. Thus, in typical distributed object systems, because remote objects are only exposed via their interfaces, the type of the remote object is typically defined by its interfaces.

Prior art distributed systems have a number of disadvantages, especially if applied to large-scale, dynamic and loosely-coupled computing domains, such as the Internet. In this context, large numbers of objects are continually changing in terms of number and characteristics; objects (or their methods and attendant interfaces) may, for example, be continually fine-tuned, added or subtracted from the distributed system. In this context, infrastructure mechanisms providing for run-time discovery of desired objects becomes increasingly important as old object references become obsolete or replaceable by new, improved objects. Prior art distributed architectures, however, provide limited mechanisms for dynamically discovering objects because remote objects are typically exposed only via their interfaces, and thus described and discoverable solely by their interfaces. The "type" of a computation entity, such as a resource (defined below), is used herein to refer generally to a determinate set of properties belonging to the entity that is typically defined in reference to the operations performable by the entity or upon the entity. Thus, in typical distributed object systems, because the operational logic of remote objects is hidden behind their interfaces, the type of the remote object is typically known only by its interfaces. In such systems, however, the expressive or descriptive capacity of object interfaces is limited, which, in turn, limits the ability to develop flexible and fine-grained discovery mechanisms which directly depend upon the descriptive mechanisms of the objects.

As a consequence, resource discovery mechanisms in typical distributed system that rely upon interface typing mechanisms have limited flexibility and ability to distinguish among objects in large object domains. In other words, as the number of objects increases, the ability to flexibly distinguish closely-related objects in terms of interface-based descriptions becomes increasingly strained, and discovery mechanisms built upon such an architecture become increasingly limited in their ability to accurately identify suitable objects. For example, numerous objects executing document printing services may be offered under an object interface name "printer" having methods "print" and "status," and yet differ significantly in the type of services performed; the objects may significantly differ, for example, in terms of print quality, stationary choices, capacity, equipment, physical location, costs, speed of delivery, types of documents, and other factors. Discovery mechanisms limited in their searching capacities to the interface elements "printer," "print" and "status" therefore have limited ability to discover complex objects in large-scale, diverse object domains.

Prior art interface-based typing mechanisms have an additional disadvantage. In the large, loosely-coupled Internet domain, for example, successful development of a large, viable market of objects may require specialization in how the service objects are delivered to clients over the computer network. In particular, specialization in the advertising, discovery and development of service objects may be needed. Interface-based typing systems, as discussed above, may not provide a sufficiently flexible object description mechanism to support specialized development of such service object markets.

SUMMARY OF THE INVENTION

What is needed and herein disclosed is a method and system for typing distributed resources, including service, vocabulary and contract resources, in a distributed system which thereby provides an infrastructure for improved resource description and discovery in large resource domains. In some embodiments, the interface data for accessing a resource is de-coupled from the resource and constructed into an independently discoverable resource, called a contract resource. In some embodiments, the explanatory schema for explaining attribute-based descriptions of resources is also separately constituted into a discoverable resource, called a "vocabulary resource." In some embodiments, every resource in the distributed system, including service, vocabulary, and contract resources, is typed with one or more vocabulary resources and one or more contract resources; the vocabulary resources provide information explaining the descriptive terms used for describing resources, and the contract resource provides interface data for accessing the resource. In the case of vocabulary resources, this definition leads to a recursive situation (i.e., every vocabulary resource, as a resource, must be typed by another vocabulary resource). Accordingly, in some embodiments, the infrastructure supplies a discoverable default base vocabulary resource which is not itself typed by other vocabulary or contract resources (but may be invoked). In some embodiments, the infrastructure also provides default contract resources for service, vocabulary and contract resources which are not typed by other contract or vocabulary resources (but may be invoked). The typing mechanism and system provided herein according to some embodiments permit the independent development and discovery of standard contract and vocabulary resources tailored to particular industries, and provides an improved descriptive mechanism for describing remote resources applicable within object environments.

In some embodiments, a method and system of discovering target resources in a distributed system is provided as an integral aspect of the typing mechanism. In some embodiments, a search request is received by the infrastructure that includes a target description describing the target resources. The infrastructure searches a database containing resource information, including resource descriptions describing associated resources, explanatory information explaining the resource descriptions, and access data for accessing the associated resource. The infrastructure then determines whether one or more resource descriptions match the target description, and then sends information resulting from the search back to the client, including information about matching resources. Because the typing mechanism, in some embodiments, provides that vocabularies and contracts are discoverable resources, searches for service resources may be efficiently conducted by searching first for the vocabulary and or contract resources by with the service resources are typed. In addition, service providers seeking to market their service resources to large markets may, in some embodiments, search for standard or popular vocabulary or contract resources used in the industry by which to type their services.

Other variations to the above embodiments are also described.

BRIEF DESCRIPTION OF THE DRAWINGS

FIG. 8D is a table illustrating the values supported by the valuetype field in the attribute property, according to some embodiments.

DETAILED DESCRIPTION OF THE INVENTION

Figure 1:
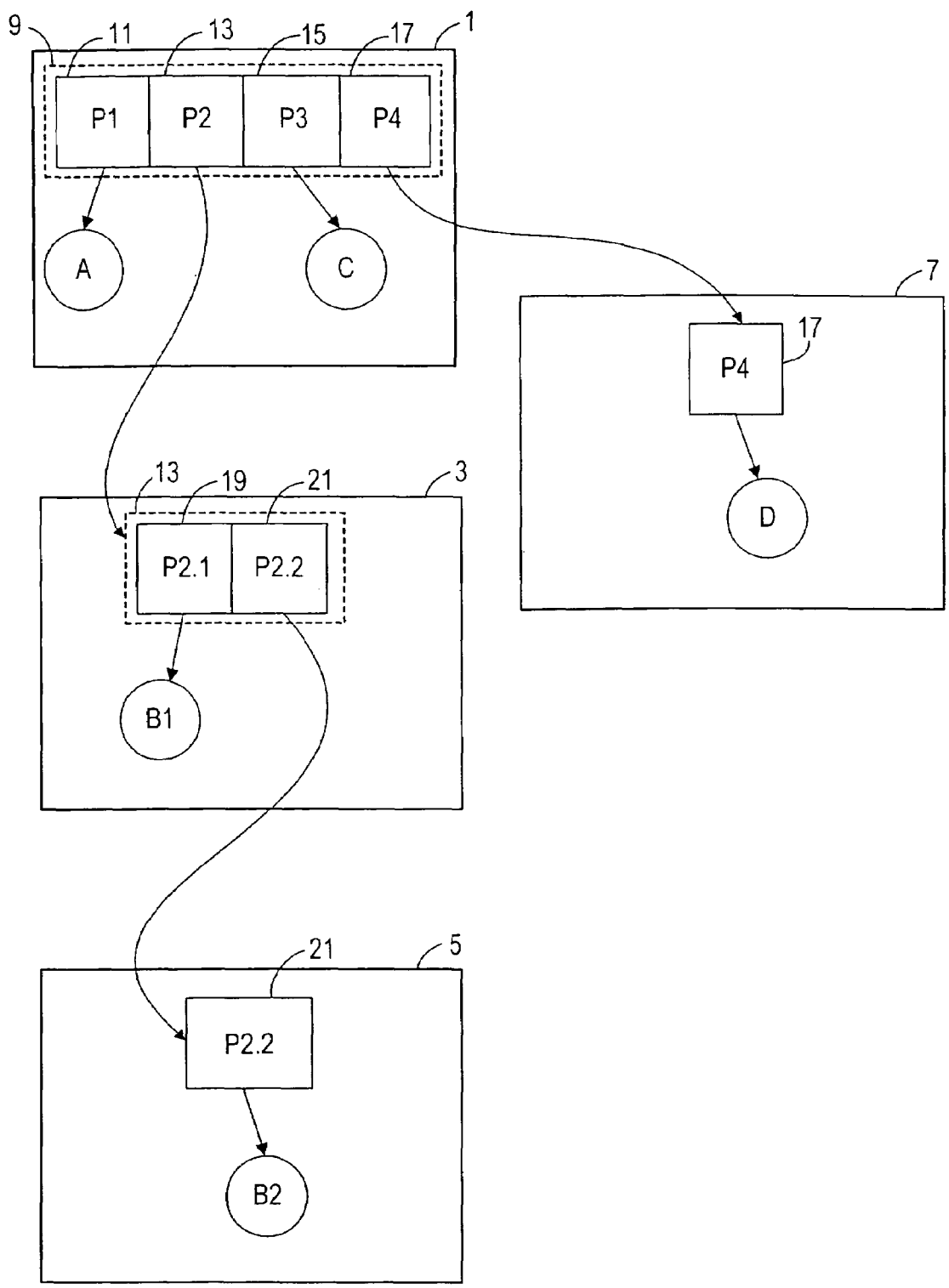
FIG. 1 is a block diagram illustrating a distributed system at the abstract level.

The invention disclosed herein provides a mechanism for typing computer resources in a platform-independent distributed architecture. In particular, some embodiments of the present invention are described in detail in reference to the Hewlett-Packard E-Speak Service Engine Development Platform, Developer Release 3.03 (hereafter, "E-Speak Platform"). The E-Speak Platform is a distributed object infrastructure developed and released by Hewlett-Packard under an open-source license. The E-Speak Architectural Specification, Developer Release 3.03, and the E-Speak Programmer's Guide, Developer Release 3.03, both providing detailed specifications and descriptions of the E-Speak Platform, were also developed and released by Hewlett-Packard under an open-source license. The E-Speak Architectural Specification, Developer Release 3.03, the E-Speak Programmer's Guide, Developer Release 3.03 and the E-Speak Service Engine Development Platform Release 3.03, are attached as CD-ROM Appendices A, B and C, respectively to U.S. patent application Ser. No. 09/733,012, incorporated by reference herein. It should be noted that although the present invention is herein disclosed primarily as implemented in the E-Speak Platform using object-oriented technology, it is not limited to any particular distributed platform or to any particular programming methodology, such as object-oriented programming. On the contrary, many distributed platforms may incorporate differing embodiments of the invention disclosed herein, and, generally, any distributed computational process (e.g., a legacy application) may be adapted by conventional programming techniques e.g., wrapping the legacy application in a suitable object structure or otherwise adapting the process with a suitable interface—to employ the invention described herein. Additionally, a distributed architecture implementing an embodiment of the present invention may also be constructed using traditional procedural programming techniques (or a combination of object-oriented and procedural programming techniques).

For purposes of the detailed description, the following terms are defined. A "resource" is a generic reference to any computational process, such as a file server, an online banking service or an infrastructure-supplied searching function, that may be virtualized in a distributed computing system, and discovered or invoked by other resources. Resources may be classified in reference to how they are managed. An "external resource" refers to resources that are managed by an entity external to the distributed infrastructure, such as the provider of online banking services. "Core-managed resources" refers to resources that are supplied and managed by the distributed infrastructure, also referred to as the "core." Resources may also be classified in terms of their function. Three types of resources in this sense are important for the detailed disclosure herein. First, a "service" resource, or simply "service," generally refers to loosely-coupled network applications provided by an external service provider; an online banking resource offered by a bank is a paradigmatic service. Second, a "vocabulary" resource, or simply "vocabulary," is a core-managed resource used for organizing information for describing resources. Although vocabularies are core-managed, the descriptive information contained in a vocabulary is typically provided by an external entity, such as the online banking provider. The core as described herein provides certain default vocabularies. Third, a "contract" resource, or simply "contract," is a resource that contains interface, stub or other information needed for accessing a resource. The interface data is typically expressed in an IDL language specific to the distributed system; this ensures platform-independence for the distributed infrastructure. A "client" refers to any computational process, often used by a human agent, accessing resources via the distributed infrastructure, including external and core-managed resources. A client thus includes both a service provider (which uses the infrastructure to make its services available over the distributed network) and a service user (which accesses available resources).

Architecture Overview

Figure 2:
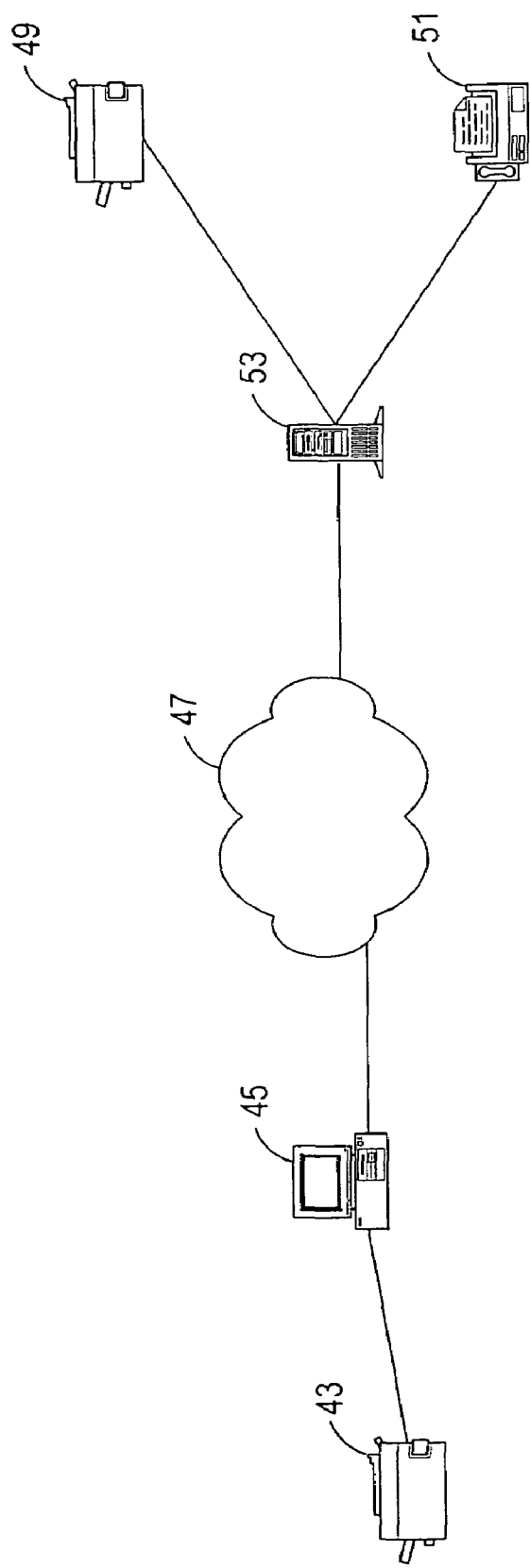
FIG. 2 is a block diagram illustrating a device-level view of a simplified distributed system implementing the typing mechanism of the present invention, according to some embodiments.

FIG. 2 is a block diagram illustrating a device-level view of a simplified distributed system implementing the typing mechanism of the present invention, according to some embodiments. In FIG. 2, computers 45 and 53 are interconnected via communications medium 47. In some embodiments of the present invention, computers 45 and 53 may be Hewlett-Packard 9000 computers executing the E-Speak Platform within an HP-UX operating system version 11.00. The E-Speak Platform provides a distributed object infrastructure implementing one embodiment of the typing mechanism of the present invention. Communications medium 47 facilitates the transfer of electronic content between attached computers 45 and 53. In some embodiments, the communication medium 47 includes a global-area network, such as the Internet; the Internet comprises the millions of computers interconnected by the well-known TCP/IP communication protocol. The communication medium 106 may also include local area network (LAN), wide area network (WAN), metropolitan area network (MAN), a public Internet, a private intranet, a private computer network, a secure Internet, a private network, a public network, a value-added network, an interactive television network, a wireless network, and generally any other connection capable of delivering electronic content between computer devices. Communication medium 47 may operate with communication protocols other than TCP/IP, such as the Open Systems Interconnection developed by the International Standards Organization, and Netware from Novell Corporation of San Jose, Calif. Those skilled in art will recognize that the present invention may operate on numerous and various computers, development software, operating systems and communication mediums, and the present invention is not limited to any particular type or brand of computer, development software, operating system or communications medium. Returning to FIG. 2, computers 45 and 53 are connected to external resources; specifically, computer 55 is connected to printer 43, and computer 53 is connected to printer 49 and fax 51.

Figure 3:
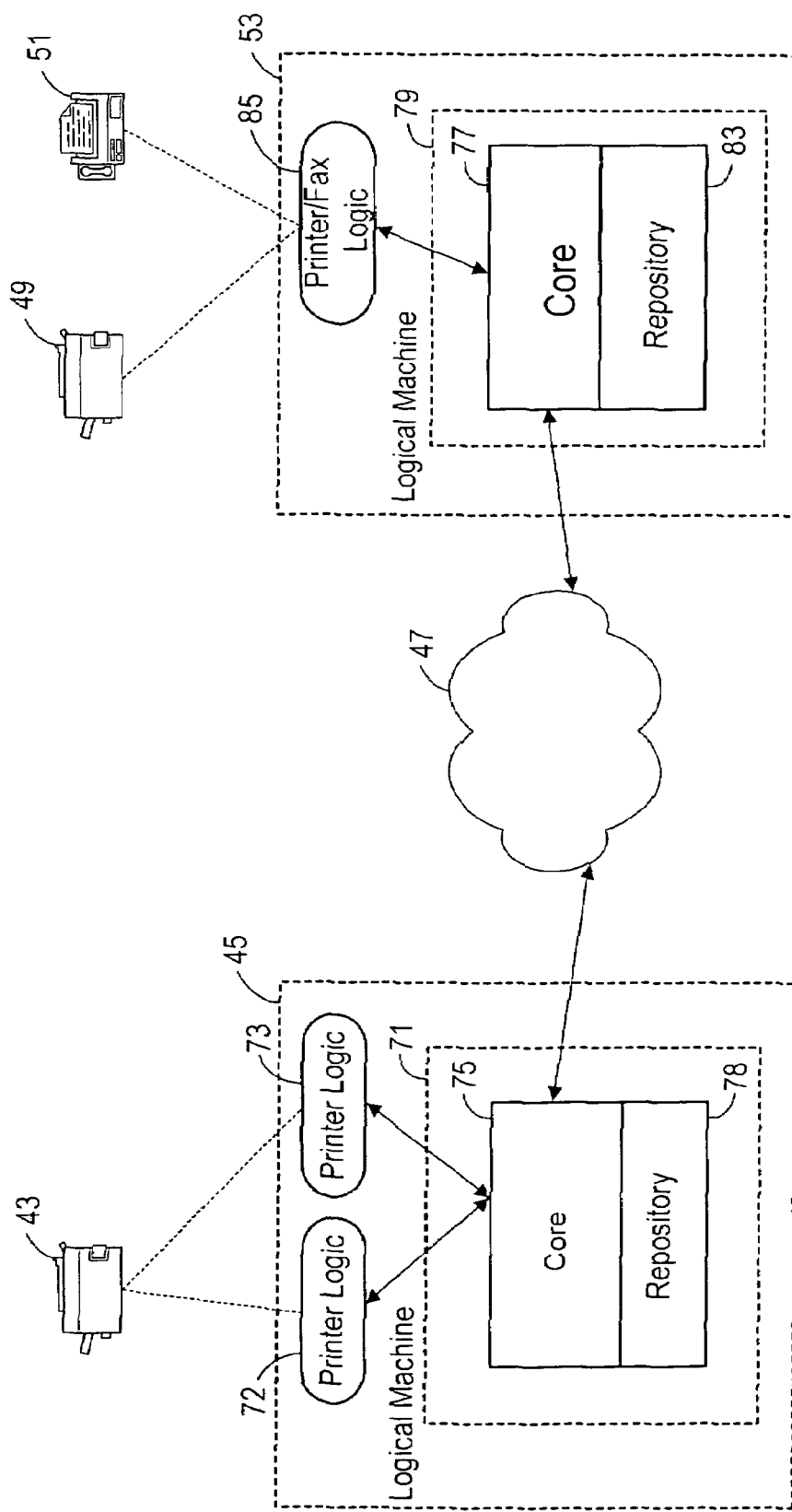
FIG. 3 is a block diagram illustrating a process-level view of the distributed system depicted in FIG. 2.

FIG. 3 is a block diagram illustrating a process-level view of the distributed system of FIG. 2. Computers 45 and 53 (or, more precisely, the address spaces of computers 45 and 53) execute Logical Machines 71 and 79 respectively. Logical Machines 71 and 79 comprise the infrastructure logic for the E-Speak Platform. The distributed system, in this simplified example, comprises infrastructure logic, i.e., Logical Machines 71 and 79, and the external resources—e.g., 43, 49, and 51—that they interconnect. Each Logical Machine 71 and 79 is a single instance of the E-Speak Platform. It should be noted that multiple Logical Machines may execute on a single physical machine, or the components of a single Logical Machine may be distributed across multiple machines. Each Logical Machine, e.g., 71 and 79, consists of a core, 75 and 77, and a repository, 78 and 83. Logical machines 71 and 79 are interconnected via their cores 75 and 77, and cores 75 and 77 are connected via communications medium 47. Each core, e.g., 75 and 77, consists of the process logic comprising the E-Speak Platform infrastructure; this includes, for example, process logic for registering, invoking, discovering and managing resources, for mediating and controlling resource access and access rights, for processing and routing messages between resources, and for maintaining client-specific interface data. The principal core processes are themselves core-managed resources. The core, e.g., 75, mediates all resource access (to both external and core-managed resources) using metadata stored in the repository, e.g., 78. Each resource, whether external or core-managed, which is accessible by a core has metadata describing it (vocabulary) and providing access to it (contract). The core, e.g., 75, only operates on the resource metadata, and does not access resource implementation logic directly (except for core-managed resources). Instead, the core provides directs and controls communication between resources via message passing. A core "accesses" a resource specific implementation logic by passing a message to a resource-specific handler, or "resource handler" (described in reference to FIGS. 4A and 4B); the resource handler, however, is not part of the core architecture.

Returning to FIG. 3, printer device 43 is connected to core 75 via implementation logic 72 and implementation logic 73 which provide services implementing the printer device 43; printer device 49 and fax device 51 are connected to core 77 via implementation logic 85 which provides fax/printer services implementing the printer 49 and fax 51. As illustrated in FIG. 3, a physical device may be implemented by one or more implementation logic, and likewise, one implementation logic may provide services implementing multiple physical devices. As used herein, "resource" refers generally to the process logic, e.g., 72, 73 and 85, implementing physical devices, e.g., 43, 49 and 51, and not primarily to the physical devices themselves. After a resource is connected or registered with a core, the resource becomes part of the distributed system, and becomes potentially accessible to other resources or clients likewise connected to a core. Thus, a user that connects to core 75 is connected locally to, in the system illustrated in FIG. 3, printer resources 72 and 73, and remotely to printer/fax resource 85.

Figure 4A:
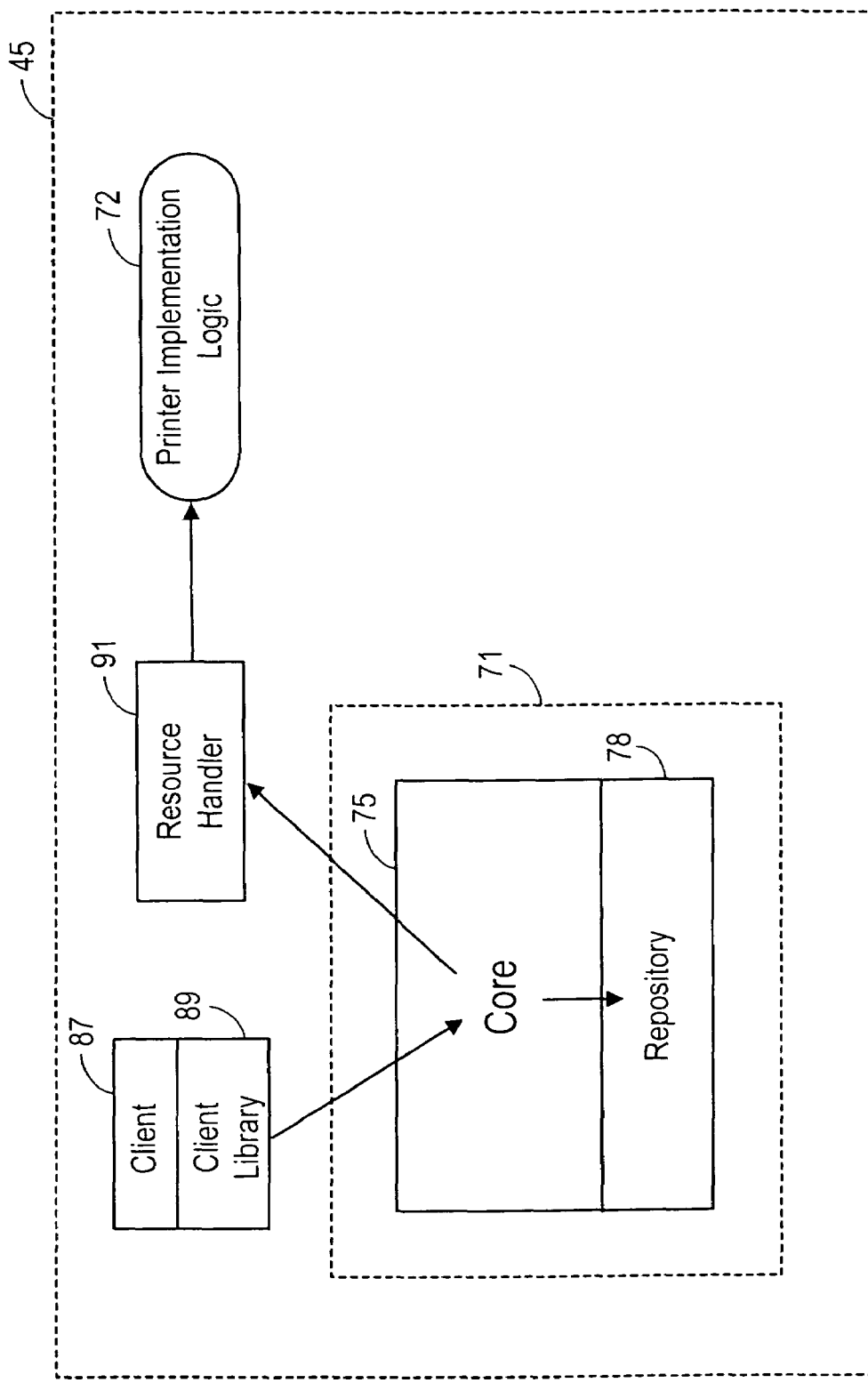
FIGS. 4A and 4B are block diagrams illustrating local and remote resource access in the distributed system depicted in FIG. 2.
Figure 4B:
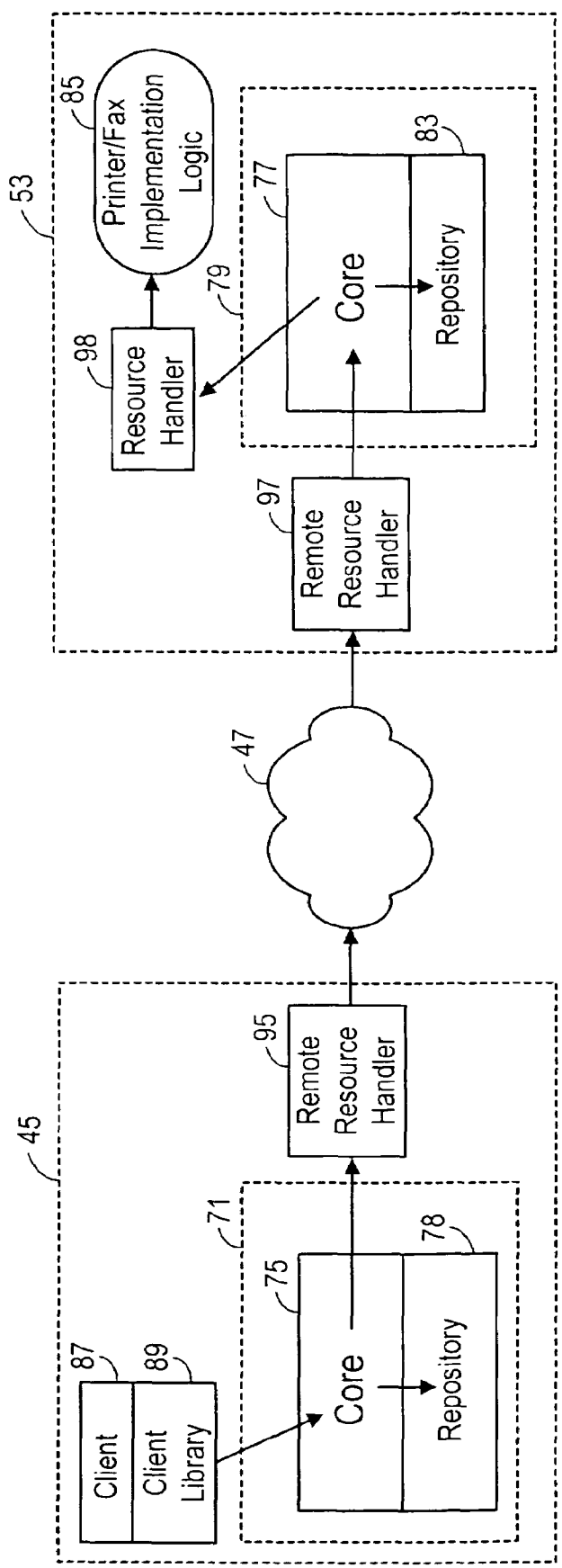

FIGS. 4A and 4B are block diagrams illustrating local and remote resource access in the distributed system depicted in FIG. 2. In particular, resource access is illustrated in the simplified situation in which a client already possesses a reference to the resource, and thus the resource does not need to be discovered. Turning to FIG. 4A, local resource access is illustrated in reference to a client connected to Logical Machine 71 accessing printer logic 72. FIG. 4A shows logical machine 71, printer resource 72, resource handler 91, and client process 87 executing in the address space of machine 45. Client process 87 accesses the core 75 via a client library 89 providing APIs to the core 75; the client library 89 is provided as a component of the E-Speak Platform. Client process 87 is typically a resource requesting access to another resource, for example, a word processing resource requesting printing services from printing resource 72. Client 87 therefore sends a message to the core 75 naming the printer resource 72, e.g., by providing the URL for printer resource 72, and typically attaching a payload (in this case, for example, a document to be printed). After the core 75 receives the message, the core 75 accesses repository 78 for the metadata belonging to printer resource 72 to determine which resource handler processes requests to printer resource 72. The core 75 discovers the appropriate resource handler 91 from the metadata, and sends the message to it. The resource handler 91 then interfaces the resource implementation logic 72 and passes the service-dependent instructions and data to execute the client's 87 request. All local resource access is performed in the same manner. Thus, after printer resource 72 processes the request, it pass a result of the request back to the client process 87; in this situation, the printer resource 72 operates as a new "client process" sending a return message to the core, which is forwarded by the core to a resource handler for the client 87.

Turning to FIG. 4B, remote resource access is illustrated in reference to a client connected to Logical Machine 71 accessing remote printer/fax logic 85. In FIG. 4B, core 75 and its repository 78, and core 77 and its repository 83, execute in different address spaces on different physical machines, e.g., computer 45 and computer 53 respectively. Cores 75 and 77 are connected via remote resource handlers associated with each core; thus, core 75 is connected to (and executes in the same address space as) remote resource handler 95, and core 77 is connected to (and executes in the same address space as) remote resource handler 97. The remote resource handlers 95 and 97 are, in turn, connected via communications medium 47. Client process 87, executing in the core 75 address space, sends an access request message to core 75 naming remote printer/fax resource 85, e.g., providing the URL to remote resource 85. A routing process in core 75 determines that remote resource 85 is local on core 77, and routes the message to remote resource handler 95. Remote resource handler 95 in turn sends the message to counter-part remote resource handler 97 executing in the core 77 address space. The remote resource handlers 95 and 97 mediate communication between cores 75 and 77, and maintain information such as which remote resource handler the message is to be routed, and the communication method or protocol to be used over communication medium 47. After the message is received by remote resource handler 97, the process of accessing remote printer/fax resource 85 is then identical to local resource access described in reference to FIG. 4A; in this situation. However, remote resource handler 97 operates as the local client process sending the message to local core 77 (core 77 is now local to remote resource handler 97). Thus. Remote resource handler 97 sends the message to the core 77, which then accesses repository 83 for the metadata of printer/fax resource 85. The core 77 determines the appropriate resource handler 98 for the printer/fax resource 85, and sends the message to resource handler 98 accordingly. The resource handler 98 then interfaces printer/fax logic 85 and sends resource-specific data and instructions to printer/fax resource 85 to execute the request.

Printer/fax resource 85 may then operate as a second client process when returning a message containing results back to client process 87.

Resource Typing

As described in reference to FIGS. 4A and 4B, the core provides core-managed resources for invoking local and remote external resources, e.g., processing and routing messages, accessing repository metadata. The access methods described in reference to FIGS. 4A and 4B, however, require the client to name the resource, and thus know in advance the resource name; in this situation, the client also commonly knows the resource's interfaces prior to invoking the resource, or possesses a stub class for invoking methods on the resource. In a dynamic Internet-like computing domain, however, the client often may not have a reference to a desired resource, or know in advance the interfaces by which to invoke methods on the resource. In this situation, the core provides flexible core-managed discovery resources constituting a component of the resource typing mechanism of the present invention, according to some embodiments.

Figure 5A:
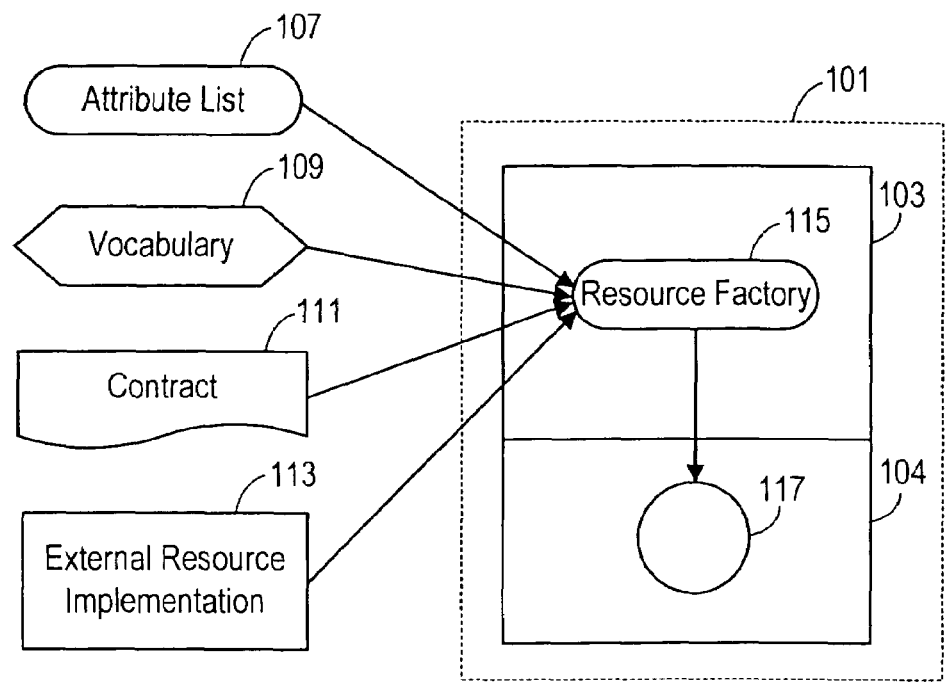
FIG. 5A is a block diagram illustrating the resource typing mechanism of the present invention, according to some embodiments as implemented in the E-Speak Platform.

FIG. 5A is a block diagram illustrating the resource typing mechanism of the present invention, according to some embodiments as implemented in the E-Speak Platform. Specifically, some embodiments of the resource typing mechanism are illustrated in Figure 5A in the context of registering an external resource with a core. Accordingly, a logical machine 101, consisting of core 103 and repository 105, and external resource (implementation logic) 113 are shown in FIG. 5A. External resource 113 is registered with the core using a core-managed resource, or resource factory 115. For purposes of registration, resource factory 115 must be provided with, among other items, a reference to the external resource (e.g., the implementation logic for the external resource), interface data for accessing the external resource, called the resource "contract" 111, an attribute list 107 conforming to a vocabulary 109 that describes the external resource 113, and the vocabulary 109 that defines the meaning of the attributes in the attribute list 107. The contract 111 or the vocabulary 109 used to register the external resource 113 may be pre-existing resources previously registered with the core 103, resources newly created by, e.g., the service provider for registering the particular external resource 113, or a core-supplied default contract or vocabulary resource. After receiving the registration request, the core-managed resource factory 115 types the external resource 113 by creating a metadata object 117 in repository 104, containing the attribute list data, and a reference to the vocabulary and contract data. In some embodiments, the external resource implementation logic may be included in the corresponding metadata items 117; in other embodiment, only references, including a reference to the attribute list, may be included in the metadata items. In some embodiments, resource references may consist of URLs. In some embodiments, a resource may be registered and typed under multiple contract and vocabulary resources.

In some embodiments of the resource typing mechanism of the present invention, the contract data and vocabulary data used for registering a resource are themselves typed as registered and discoverable resources in addition to metadata items for the resource. Thus, every contract and vocabulary, as a resource, is itself typed with a contract and vocabulary resource, which serve also simultaneously as metadata items for the respective contract or vocabulary resource. Thus, referring back to FIG. 5A, in the event that the vocabulary 109 or the contract 111 for external resource 113 (the external resource 113 may itself be a vocabulary or contract definition) is newly created, the vocabulary 109 or the contract 111 must be registered with the core 103 prior to the external resource 113; only after the vocabulary 109 or the contract 111 are registered with the core bay they be used as typing resources for other resources, e.g., for external resource 113. Thus, for example, if the vocabulary 109 is newly created, the external service provider must—as is the case when registering any resource, such as external resource 113—provide the resource factory 115 with, among other items, the vocabulary 109, a contract (not shown) supported by the vocabulary 109 (e.g., typically the default base vocabulary-contract), an attribute list (not shown) describing the vocabulary, and a reference to a second vocabulary resource (not shown) that defines the meaning of the attributes in the vocabulary 109 attribute list (not shown). Because each vocabulary and contract resource—as all resources—must be typed with (registered under) another vocabulary and contract resource, a recursive condition obtains. In one embodiment of the present invention, the recursion is avoided using default or base vocabulary and contract resources supplied by the core, which are not themselves typed in reference to other vocabulary and contract resources. (In some embodiments, a resource is automatically typed by a default vocabulary or contract if the resource provider has not indicated otherwise.) In particular, any resource, whether a service, contract or vocabulary, may be typed under a single core-managed default vocabulary resource (hereafter, "base vocabulary"). Additionally, the core provides a default contract for each resource category, a default contract for contract resources (hereafter, "base contract-contract"), a default contract for vocabulary resources (hereafter, "base vocabulary-contract"), and a default contract for service resources (hereafter, "base service contract"). In some embodiments, the default vocabulary and contract resources comprise base classes which user-provided vocabulary and contract classes extend; thus, the default vocabulary and contract classes provide a set of uniform methods for accessing contracts and vocabularies. The typing mechanism of the present invention thus, in some embodiments, defines a resource class inheritance hierarchy; this hierarchy is illustrated in reference to FIG. 6.

Figure 5B:
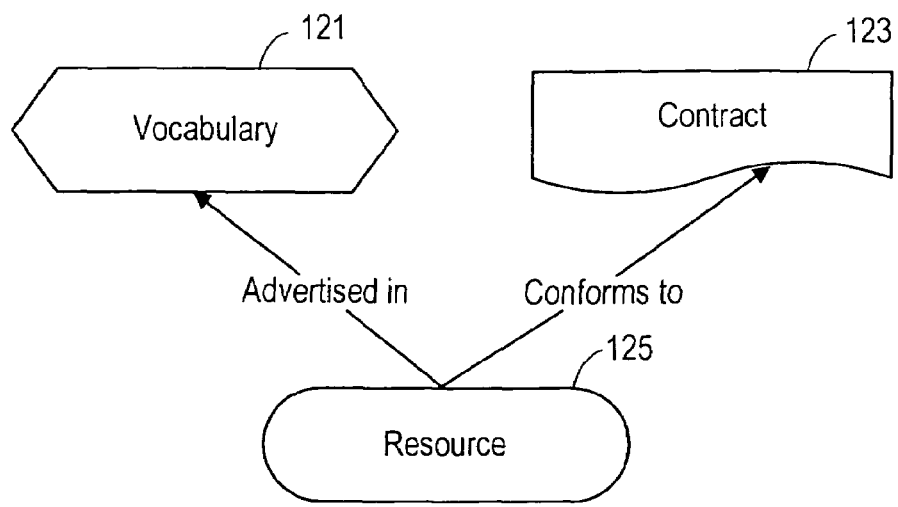
FIG. 5B is a block diagram illustrating the basic functional relationship between a resource, whether a service, vocabulary, or contract resource, and the vocabulary and contract resource with which it is typed, according to some embodiments.

FIG. 5B is a block diagram illustrating the basic functional relationship between a resource, whether a service, vocabulary, or contract resource, and the vocabulary and contract resource with which it is typed, according to some embodiments. In general, resource 125 is advertised in vocabulary 121, and conforms to contract 123. In other words, resource 125 is described by the service provider with attributes describing the features (e.g., the purpose and functions) of the resource. The attributes comprising the attribute list, however, are provided individual meaning in reference to an explanatory schema, or vocabulary 121. The vocabulary 121 thus constitutes a schema by which to advertise the external resource 125 to other resources; other clients in possession of vocabulary 121 may thus decode the meaning of the attributes provided by the service provider in the description of the resource. Because a resource is typed with its vocabulary, the vocabulary is always available to provide meaning to the descriptive attributes provided by the service provider. In addition, resource 125 conforms to its contract 123 because, as a definitional matter, the contract 123 specifies the interfaces supported by the external resource 125 (or in some cases, the contracts may contain stub classes for resource access). In some embodiments, a resource 125 may be typed with multiple vocabularies and multiple contracts. This is useful for resources such as printer/fax resource 85 in FIG. 3. In the case of the printer/fax resource 85. for example, the printer/fax resource 85 may be typed advantageously with a first vocabulary describing solely printer attributes and a second vocabulary describing solely fax attributes, in addition to a third vocabulary describing printer-faxes. Thus, the printer/fax provider may advertise his printer/fax services to a client searching exclusively for printing services, and the client may never know that the printer services advertised also provide fax services.

Figure 5C:
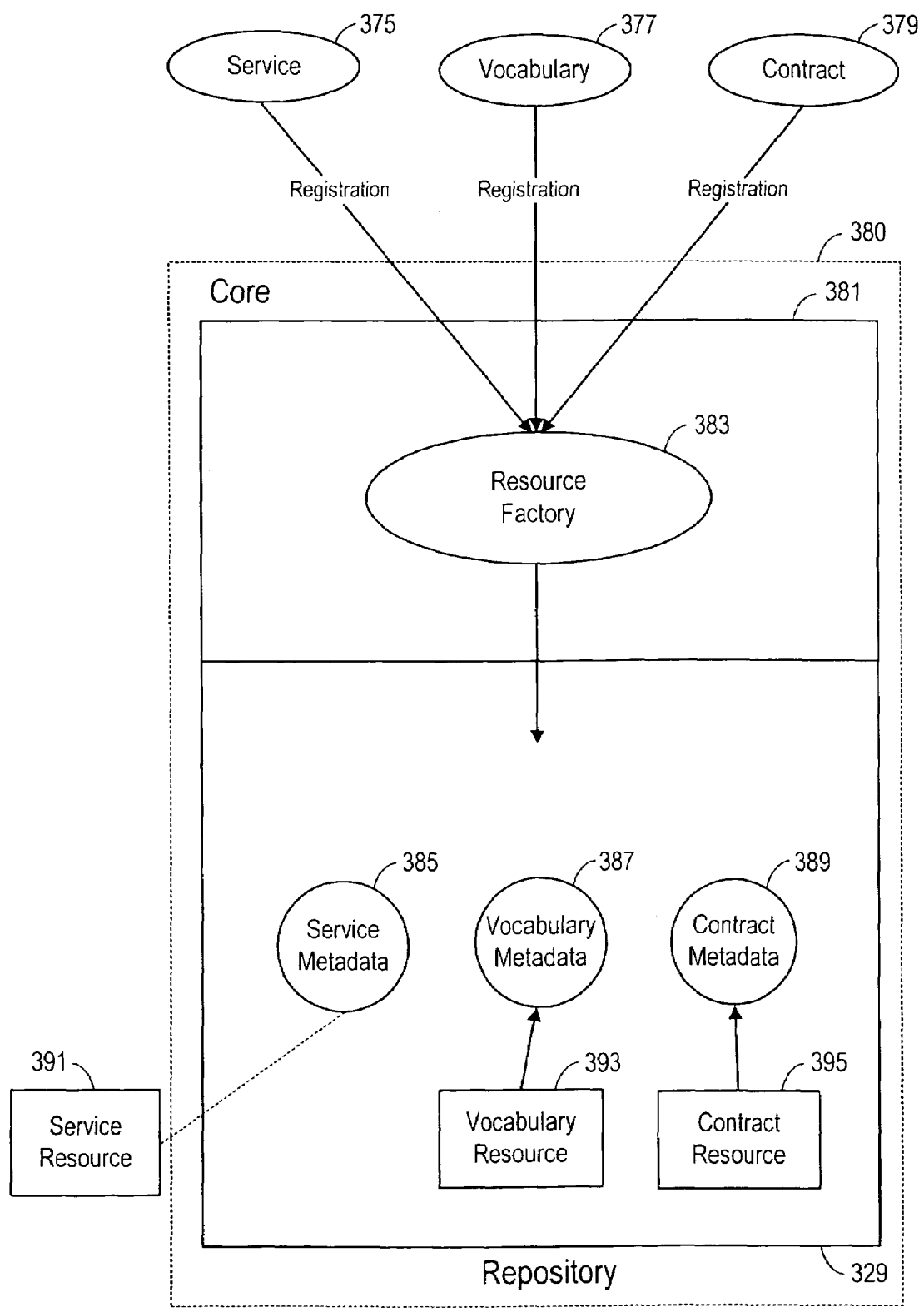
FIG. 5C is a block diagram illustrating resource registration and metadata creation by the core, according to some embodiments.

FIG. 5C is a block diagram illustrating resource registration and metadata creation by the core, according to some embodiments. In FIG. 5C, a client may register a service 375, a vocabulary 377, or contract 379 with the core 381 using a core-managed resource factory 383. For services, resource factory 383 creates a service metadata 385 for the resource that contains a reference to the service resource 391. Service resource 391, including the service implementation logic, is not maintained as part of the Logical Machine 380, and is not directly accessible by the core 381. The core 381 is only concerned with service metadata 385, namely, data needed for discovering, accessing and managing the service resource 391. In contrast to service resource 391, however, vocabulary resource 393 and contract resource 395 are managed by the core 381. Thus, when a client registers a vocabulary 377 or a contract 379 with the core 381, the core 381 accordingly creates a vocabulary resource 393 or contract resource 395 with corresponding vocabulary metadata 387 or contract metadata 389 respectively in the repository 397. Thus, the "implementing" data comprising the vocabulary and interface (e.g., a vocabulary schema, or a set of IDL interfaces or stub classes) is placed in the repository and managed by the core.

Figure 6:
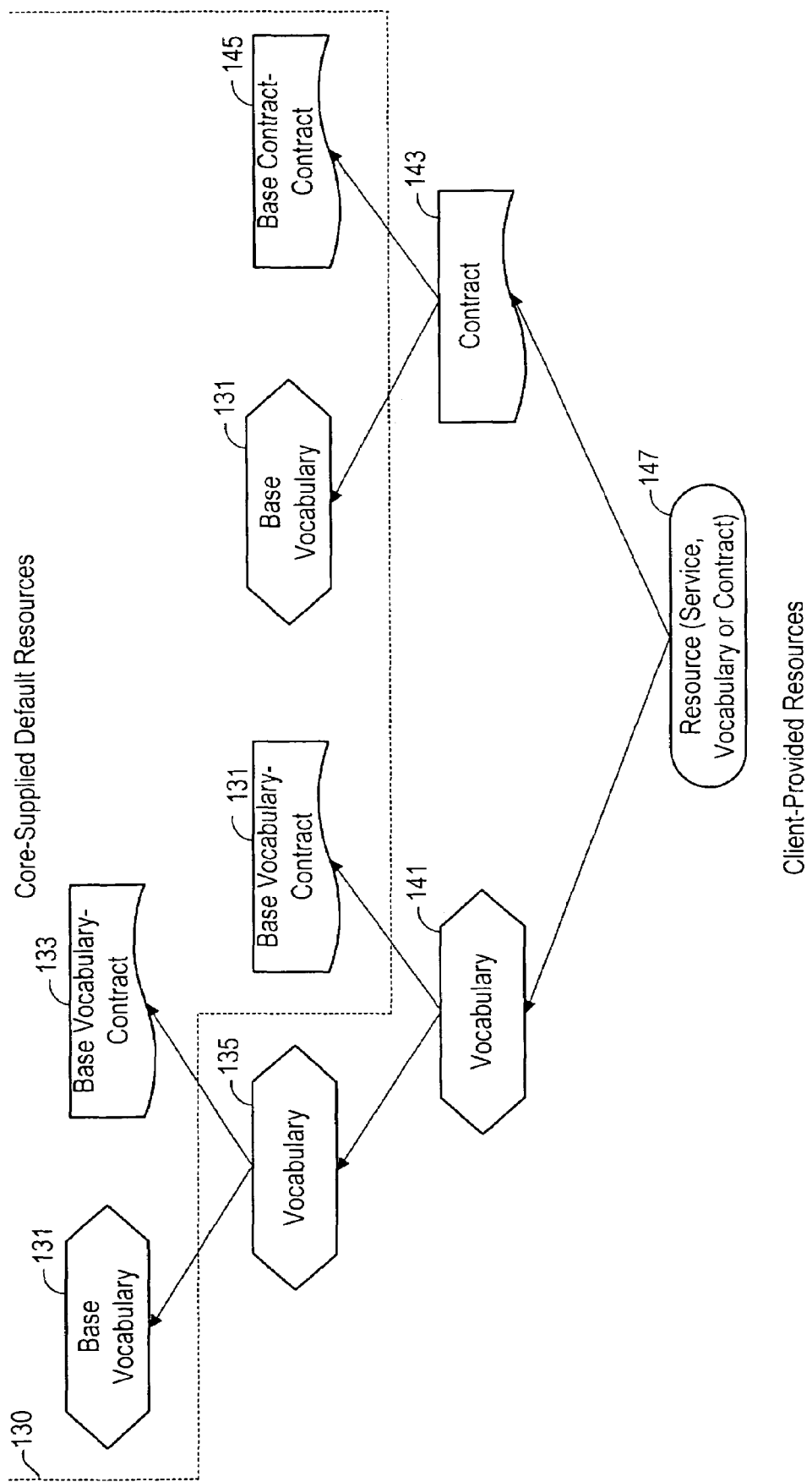
FIG. 6 is a block diagram illustrating an example resource typing relationship between client-supplied resources and core-supplied default resources, according to some embodiments.

FIG. 6 is a block diagram illustrating a example resource typing relationship between client-supplied resources, and core-supplied default resources, according to some embodiments. A "core-supplied resource" as used herein refers to a resource wholly provided by the core, and thus pre-loaded with the distributed infrastructure; examples of core-supplied resources include the finder classes used for discovering resources, and the default contract and vocabulary resources. A client-supplied resource is a resource that is defined by the client, such as interface data or vocabularies created by the client and registered with the core, and external services. Note that a client-supplied resource may be core-managed; thus, although all non-default contract and vocabularies are defined clients, they are subsequently managed by the core. Turning to FIG. 6, the resource typing hierarchy in the situation where a client registers a resource 147 under a client-defined vocabulary 141 and client-defined contract 143 is illustrated; further illustrated is that client-defined vocabulary 41 is further advertised and typed by a client-defined vocabulary 135, but client-defined vocabulary 135 and client-defined contract 143 are themselves registered and typed under core-supplied default resources. In FIG. 6, the core-supplied resources are demarcated from the client-supplied resources by dotted line 130; the resource are accordingly labeled. In the scenario depicted in FIG. 6, as a matter of chronological order, vocabulary resource 135 must be initially registered and typed before the other client-supplied resources; thus, as shown, vocabulary 135 is typed under the core-supplied base vocabulary 131 and base vocabulary-contract 133. Next, vocabulary resource 141 and contract resource 143 must be registered and typed. In this scenario, vocabulary resource 141 is advertised and typed under client-supplied vocabulary 135 and under another instance of the base vocabulary-contract class 131, and contract resource 143 is registered and typed under the base vocabulary and the base contract-contract 145. In some embodiments, vocabulary resource 141 may extend vocabulary resource class 135. In some embodiments, additionally, all vocabulary resources must extend the base vocabulary class 131. Likewise, in some embodiments, all contracts 143 must extend the base contract-contract class 145, and may extend other contract classes. Lastly, resource 147 may then be registered and typed under vocabulary 141 and contract 143.

Figure 7:
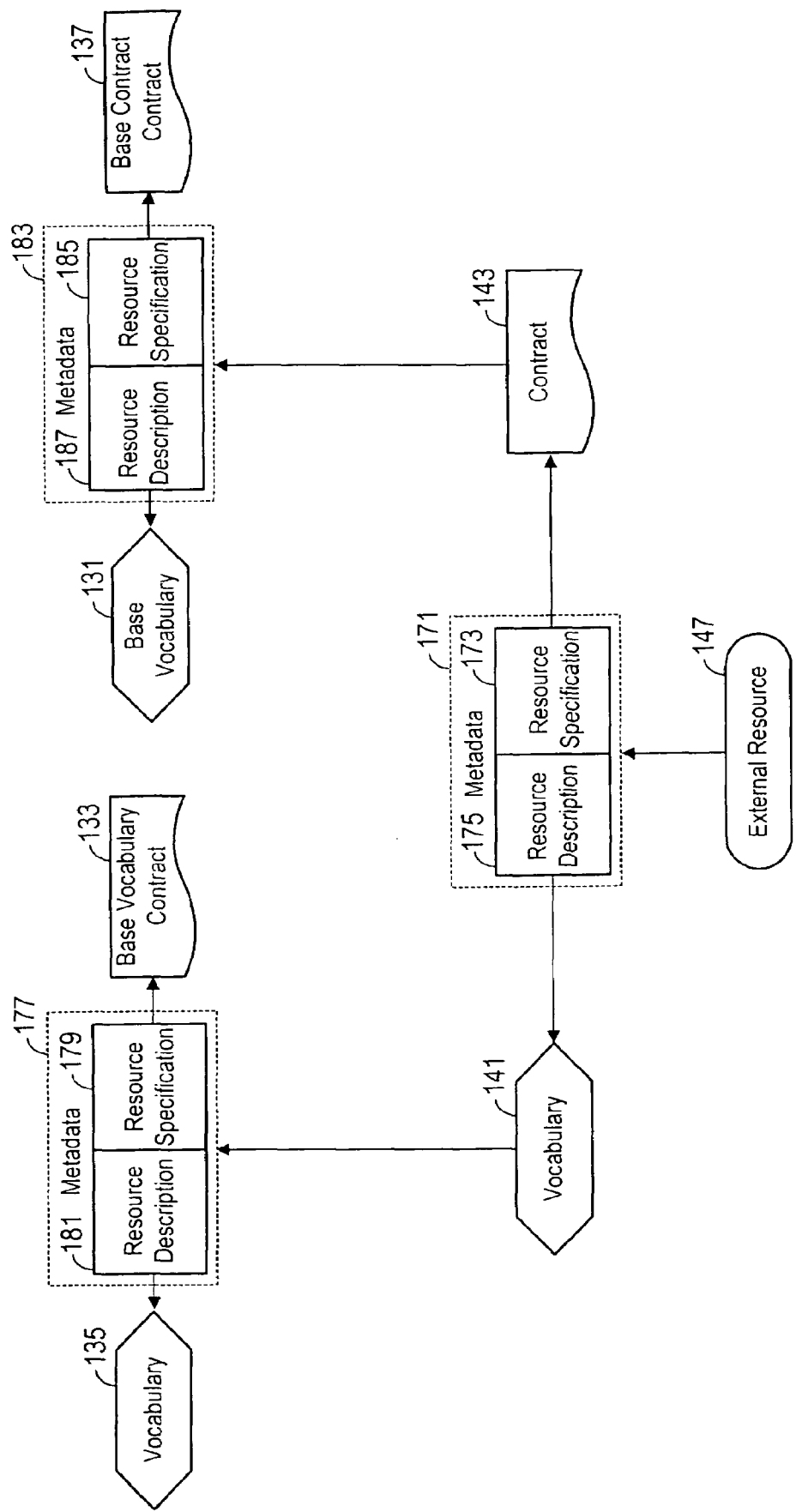
FIG. 7 is a block diagram illustrating the resource metadata typing mechanism for a portion of the resource relationship of FIG. 6, according to some embodiments.

FIG. 7 is a block diagram illustrating the resource metadata typing relationship for a portion of the resource relationship of FIG. 6, according to some embodiments of the present invention. In some embodiments, the core manages metadata in the repository for each resource known to it, whether a core- or client-managed resource. In FIG. 7, only metadata for resources at three levels is illustrated for purposes of simplicity. Turning to FIG. 7, when external service resource 147 (note that external resource 147 may be, in addition to a service resource, also a vocabulary or contract resource) is registered under vocabulary resource 141 and contract resource 143, the resource factory creates metadata object 171 comprising a resource description 175 and a resource specification 173. In general, the resource description element of the metadata contains or references information needed by the core for discovering the resource. In addition, the resource specification element of the metadata contains or references information needed by the core for accessing the resource. Resource description 175, thus, references vocabulary resource 141, and resource specification 143 references contract resource 143. When vocabulary resource 141 is registered with the core, the resource factory creates metadata 177 comprising a resource description 181 and a resource specification 179. Vocabulary resource 141, in turn, is registered under vocabulary resource 135 and, as all vocabulary resources, under core-supplied base vocabulary contract 133. Likewise, when contract resource 143 is registered with the core, metadata 183 is created comprising resource description 187 and resource specification 185. Contract resource 143 is registered under the default base vocabulary 131 and the default base contract contract resource 137. Each default resource, as a resource, also has a metadata representing it stored in the repository (not shown). Thus, for each resource known to the core (including its core-managed resources), a corresponding metadata item comprising a resource description and a resource specification is created by the core in the repository. All discovery, access and management of resources are generally performed by the core on the resource descriptions and specifications of the resource metadata stored in the repository. Note that the type of an object in the system, namely, its vocabulary-contract resource relationship, is determined by how an object is registered, according to some embodiments.

Resource Description and Vocabularies

Figure 8A:
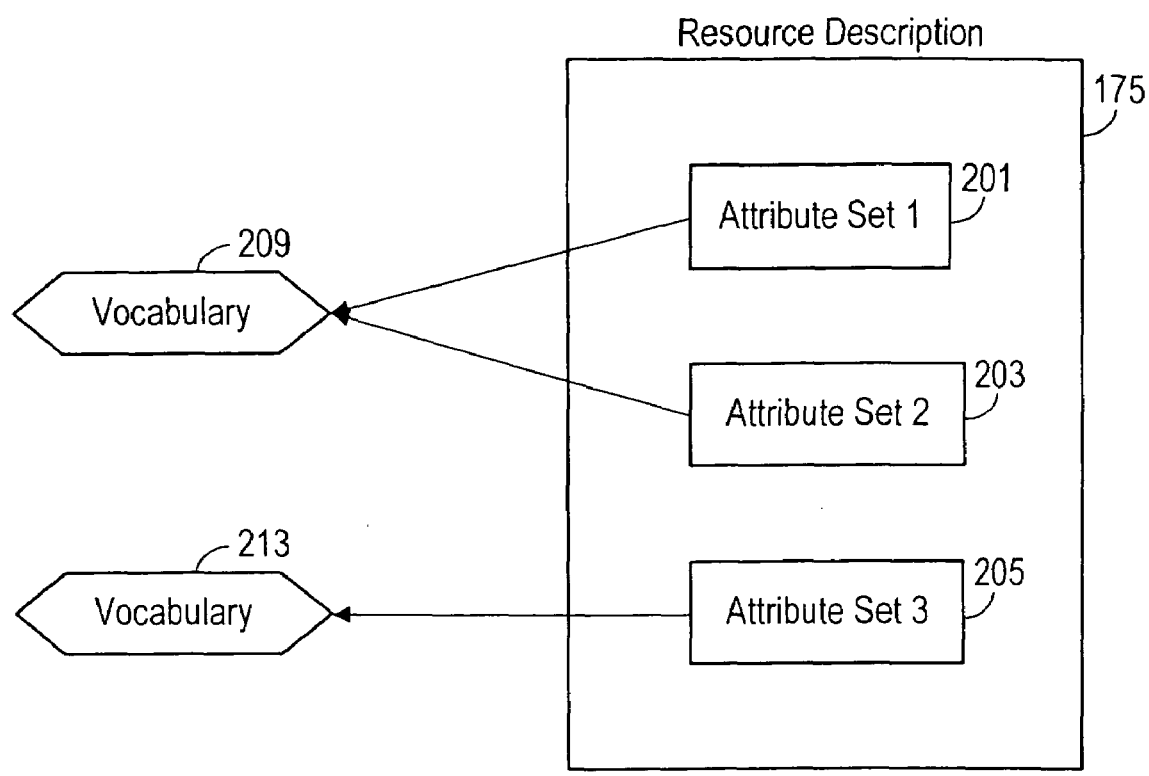
FIG. 8A is a block diagram illustrating the relationship between a resource description and a core-managed vocabulary resource, according to some embodiments.

FIGS. 8A-8D describe in detail the resource description metadata element, according to some embodiments of the present invention. In particular, FIG. 8A is a block diagram illustrating the relationship between a resource description and a core-managed vocabulary resource, according to some embodiments. In FIG. 8A, resource description 175 consists of one or more attribute sets 201, 203 and 205 that are typically defined—except for core-supplied default resources—by the service provider. (Note that in some embodiments core-supplied resources are not described with core-supplied attribute sets, but are invocable via infrastructure APIs.) Each attribute set 201, 203 and 205 is, in turn, advertised under a single vocabulary; for example, attribute sets 201 and 203 are advertised under vocabulary 209, and attribute set 205 is advertised under vocabulary 213. Vocabularies 209 and 213 may be either client-supplied vocabularies or the base vocabulary supplied by the core. In some embodiments, of the present invention, a resource description includes only one attribute set. In other embodiments, each attribute set must be advertised in a different vocabulary. In some embodiments, multiple core-supplied vocabularies may be provided in addition to the base vocabulary.

Figure 8B:
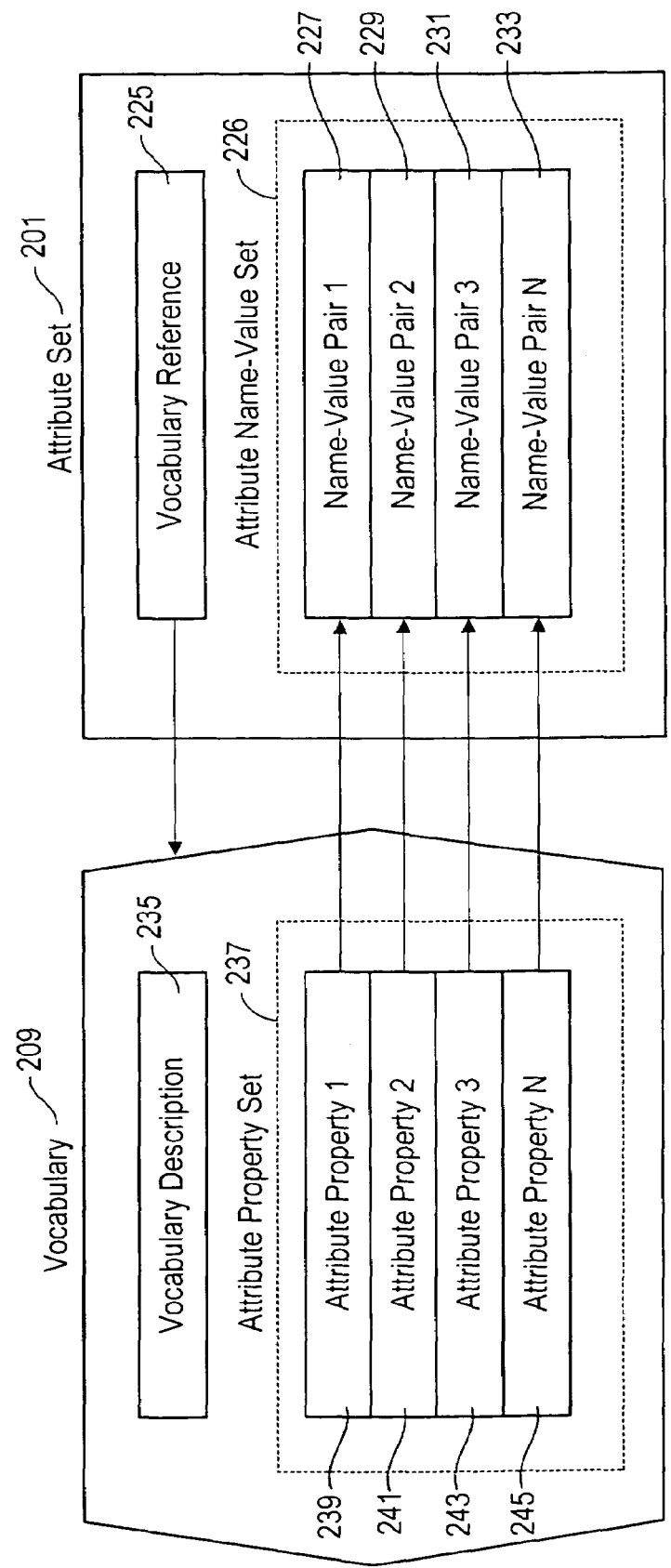
FIG. 8B is a block diagram illustrating the relationship between an attribute set and a vocabulary resource, according to some embodiments.

FIG. 8B is a block diagram illustrating the relationship between an attribute set and a vocabulary resource, according to some embodiments of the present invention. Each attribute set, e.g., attribute set 201, includes a vocabulary reference 225 and an attribute name-value set 226, according to some embodiments. Vocabulary reference 225 contains a reference to vocabulary resource 209 under which attribute set 201 is advertised; in some embodiments, vocabulary reference 225 consists of the URL of the vocabulary resource 209. Attribute name-value set 226 further consists of one or more name-value pairs, e.g., 227, 229, 231 and 233, that provide the attribute values describing the resource. Vocabulary resource 209 includes a vocabulary description 235 and an attribute property set 237. In some embodiments, the vocabulary description is a string field for providing a human-readable description of vocabulary resource 209. The attribute property set 237 consists of a list of one or more attribute properties, e.g., 239, 241, 243 and 245, corresponding in number to the name-value pairs, e.g., 227, 229, 231 and 233, of attribute name-value set 226. Each attribute property 239, 241, 243 and 245 thus provides the explanatory meaning of the corresponding name-value pair 227, 229, 231 and 233. In some embodiments, an attribute name-value set may consist of a lesser number of name-value pairs than the number of attribute properties in a corresponding attribute property list; in other words, an attribute name-value set 226 need not define an attribute name-value pair to correspond with every attribute property in the attribute property set 237.

Figure 8C:
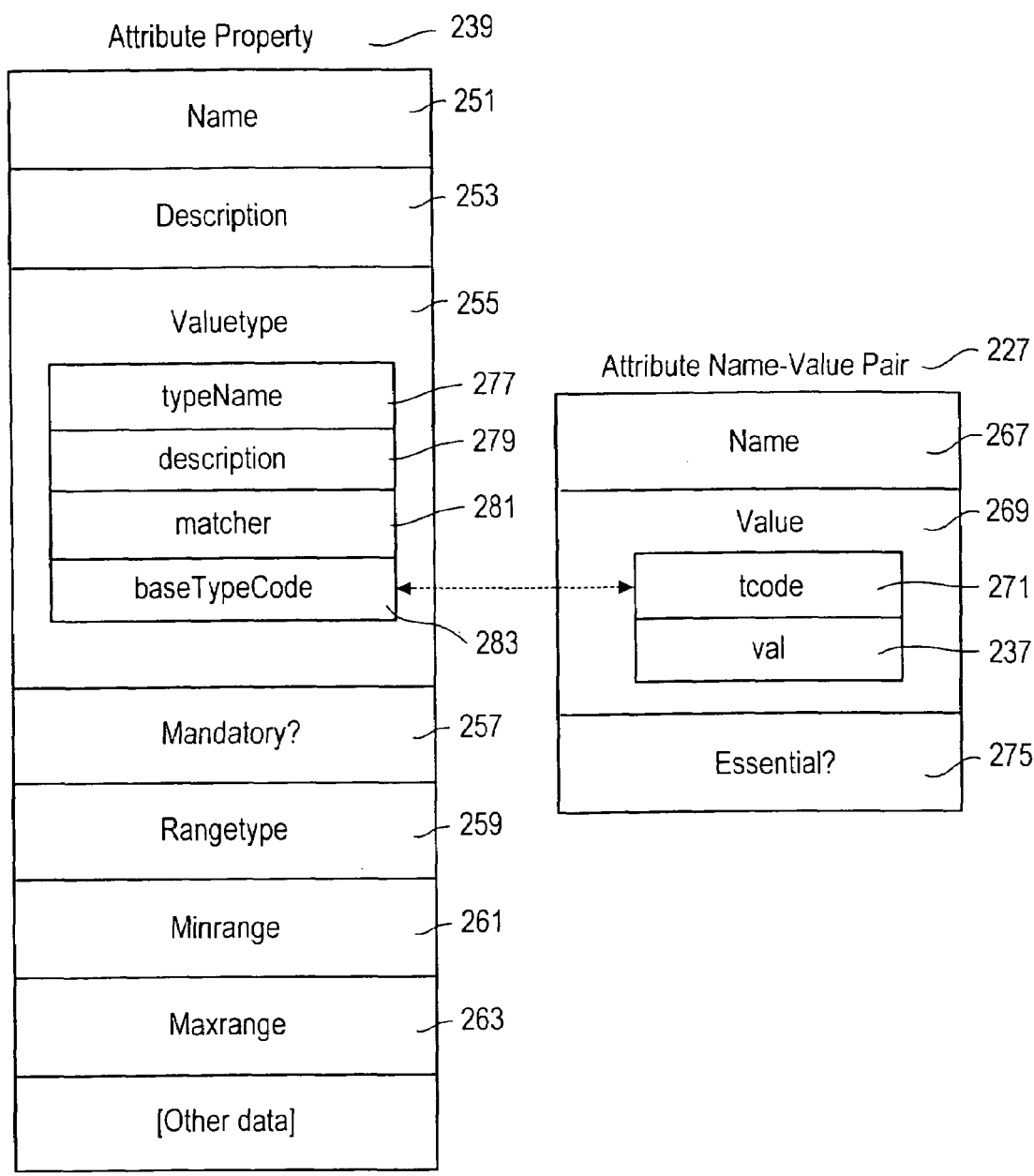
FIG. 8C is a block diagram illustrating the relationship between an attribute property and an attribute name-value pair, according to some embodiments.

FIG. 8C is a block diagram illustrating the relationship between an attribute property and an attribute name-value pair, according to some embodiments of the present invention. Attribute name-value pair 227 includes a name 267, a value 269, and an essential flag 275. The name 267 is a string field containing the attribute name. The value 269 consists of a tcode 271 and a val 273. The tcode 271 is a code denoting a data type from a pre-determined set of data types permitted by val 273. Possible tcode 271 types include, by way of example, a string, a character, an integer, a floating point number, a Boolean and a timestamp. Val 273 contains the value of the attribute with a type as specified by tcode 271. Lastly, attribute name-value pair 227 includes an essential flag 275 which is a Boolean value. If the essential flan 275 is true, then a discovery process will not return the resource unless the attribute defined by the attribute name-value pair 227 is explicitly sought by the discovery process. One use of the attribute name-value 227 may be illustrated in reference to an attribute set describing a printing resource. In particular, an attribute may be used to describe the hours of operation of the printing resource. Thus, the attribute name 267 may be "hours of operation," the essential flag 275 may be false, the tcode 271 may be a string, and the val 273 may be "loam to rpm." In this situation, however, a user may need an explanatory schema to provide greater meaning to the attribute value; for example, in an Internet context, a client will need to know the timezone for the val "10 am to 5 pm" in order for the val to be meaningful. This information may be provided in a vocabulary, and, specifically, in an attribute property 239 in a vocabulary providing meaning to the attribute value.

Returning therefore to FIG. 8C, attribute property 239 provides meaning to the attribute as defined in attribute name-value pair 227. In some embodiments, attribute property 239 may therefore include a name 251, a description 253, a valuetype 255, a mandatory flag 257, a range type 259, a minrange 261, and a maxrange 263, among other items (additional fields belonging to the attribute property 239, according to some embodiments, are described on pages 43-46 of Appendix A.) The name 251 is a stringy field containing the name of the attribute. Description 253 is a string field containing a human-readable description of the attribute. Valuetype 255 is a class that includes a typeName 277, a description 279, a matcher 281 and a base TypeCode 283. Valuetype 255 is described in reference to FIG. 8D, which is a table illustrating the values supported by the valuetype field 255 in the attribute property 239. FIG. 8D illustrates a table consisting of four columns 281, 283, 285 and 287. Column 291 consist of the set of data types that base TypeCode 283 supports; this set corresponds to the set of data types supported by tcode 271 in the attribute name-value pair 227. Thus, for every attribute registered under the vocabulary, the attribute tcode 271 must correspond in type to the base TypeCode 239; thus, tcode 271 and base TypeCode 239 may perform a type checking function between an attribute property and its value. Column 293 consists of a set of "designators," which are string descriptions for the column 291 data types. Typename 277 is a string that contains a designator corresponding to base TypeCode 293. Description 279 is a string field containing a human-readable description of the valuetype 255 Column 295 consists of the set of matching rules the core may perform on a given attribute data type; thus, depending on the data type, one or more of the following matching rules "eq" (equal to), "ne" (not equal to), "lt" (less than), "le" (less than or equal to), "gt" (greater than), and "ge" (greater than or equal to) on the attribute value. Column 297 consists of the set of operations that the core may perform on a data type; operations include Boolean operations (on Boolean types), arithmetic operations (on number types), and concatenation on string or character types.

Returning to FIG. 8C, mandatory flag 257 is a Boolean value which, if true, requires any attribute set advertised under the respective vocabulary to include the attribute named in 251. Rangetype 259 is an integer value corresponding to a pre-determined range code that specifies the kind of range-checking in relation to minrange 261 and maxrange 263 that may be performed on the respective attribute val 273 during registration of the attribute under the vocabulary. Thus, for example, if the rangetype 259 is zero, then no range-checking is performed, and attribute val 273 may be any value. If, however, rangetype is one, then attribute val 273 must be greater than or equal to minrange 261; likewise, if rangetype is two, then attribute val 273 must be less than or equal to maxrange 263. Lastly, if rangetype is three, then attribute val 273 must fall within minrange 261 and maxrange 263.

It should be noted that to those skilled in the art, the class definitions of an attribute property and an attribute that the attribute property describes are subject to numerous variations. In some embodiments, for example, the attribute property may provide no range-checking or extensive range checking, may support a greater or lesser number of attribute value data types, or may not support particular structures needed to facilitate resource registration and discovery (e.g., a mandatory flag). Likewise, in some embodiments, the attribute name-value pair may, for example, omit the essential flag, or support a greater or lesser number of attribute value data types.

Resource Specification and Contracts

Figure 9A:
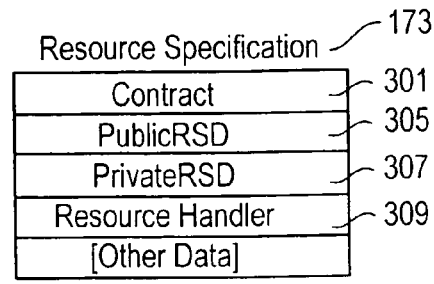
FIG. 9A is a block diagram illustrating the elements of the resource specification, according to some embodiments.
Figure 9B:
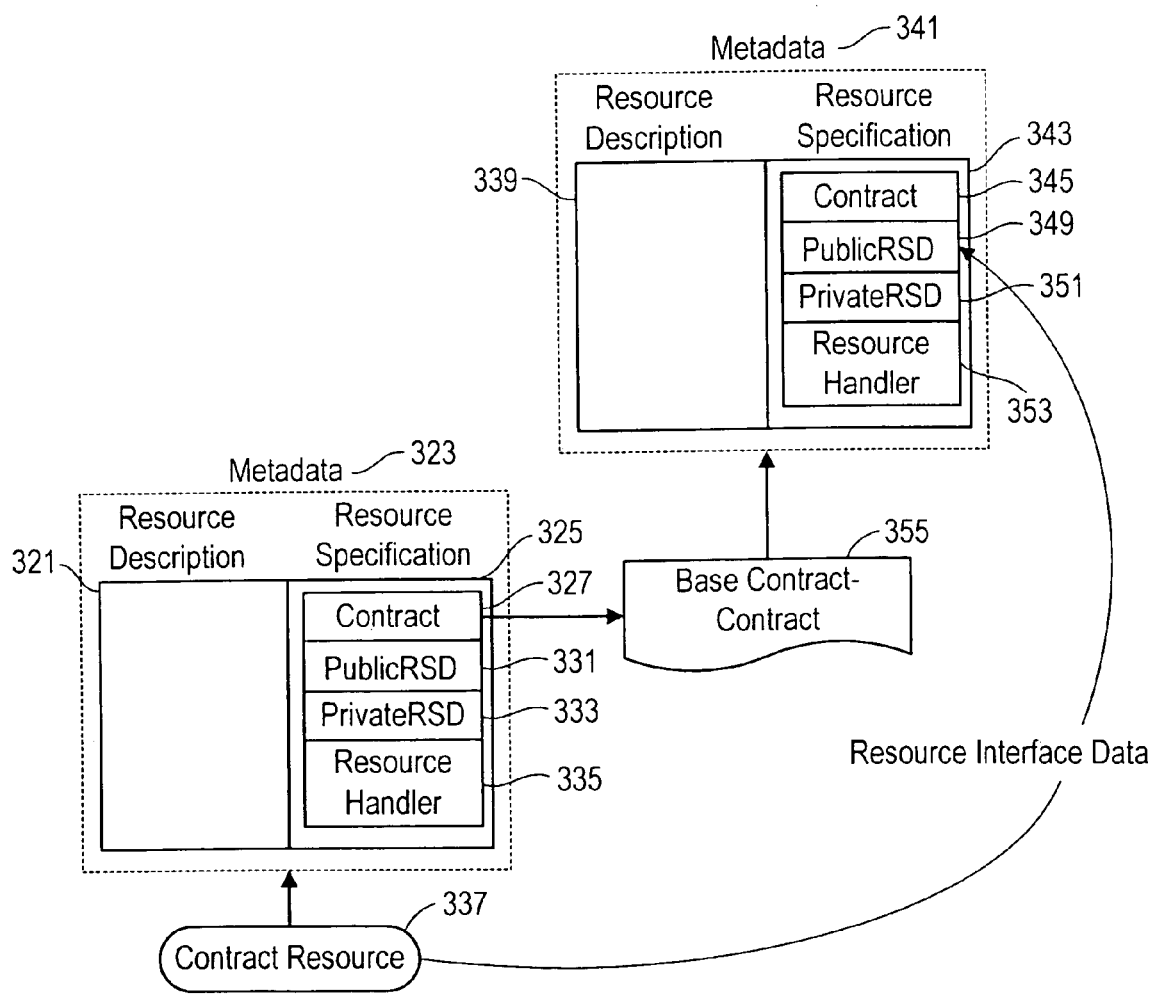
FIG. 9B is a block diagram illustrating the resource specification architecture for contract resources, according to some embodiments.

FIGS. 9A-9B describe in detail the resource specification metadata element, e.g., resource specification 173 in FIG. 7, according to some embodiments of the present invention. As described above, resource metadata is generally used by the core to discover, access and manage resources. The resource specification element of the metadata contains information needed generally for accessing and using the resource. Access information to service resources is provided by core-managed contract resources. A resource may only be registered with the core under a contract. (Note that the core provides a default contract for registering resources that do not implement an interface, according to some embodiments.) Thus, a resource is always registered under a contract resource that has already been registered in the core (with the exception of the core-supplied default contracts).

FIG. 9A is a block diagram illustrating the elements of the resource specification, according to some embodiments. Resource specification 173 includes the following elements: contract 301, publicRSD 305, privateRSD 307, resource handler 309, among other elements. The contract element 301 provides a reference to the core-managed contract resource under which a resource is registered. The relationship between a resource specification and a contract resource is described in detail below in reference to FIG. 9B. PublicRSD 305 is used by the resource provider to provide information regarding the use of the resource to potential users of the resource. This includes the interface and, if the desired by the external resource provider, stub data for invoking methods on the resource. PrivateRSD 307 is used, for example, by the resource handler when a client sends a message to the resource. Resource handler 309 contains the destination information used by the core for sending messages to the resource.

FIG. 9B is a block diagram illustrating the resource specification architecture for contract resources, according to some embodiments. As discussed above in relation to FIG. 5B, a client registers a set of interfaces with the core in a similar manner as it registers a service resource. However, the client does not specify a contract resource under which to register a contract resource, because every client-supplied contract resource is typed under an instance of the core-supplied default contract class for contract resources, called the base contract-contract 355, according to some embodiments. Returning to FIG. 9B, during registration of by a client of contract data, the core creates a core-managed contract resource 337 with corresponding contract metadata 323 in the repository. In addition, the core simultaneously types the contract resource 337 under an instance of the core-supplied base contract-contract 355 with a corresponding (instance of) base contract-contract metadata 341. Contract metadata 323 includes resource specification 323, and base contract-contract metadata 341 includes resource specification 343. Core-managed contract resource 337 and core-managed contract-contract resource are linked via contract-contract reference 327 in contract resource specification 325. The interface data supplied by the client during registration of contract resource 337 is placed by the core in the publicRSD field 349 of the resource specification 343 of the (instance of) base contract-contract metadata 341. The core may then access and retrieve the interface (and sometimes stub) data for any resource by accessing the base contract-contract metadata instance of the contract resource under which the service was registered. The resource specification architecture for vocabulary resources is similar to the architecture for contract resources, with a principal exception that a different core-supplied contract class is used exclusively for registering vocabulary resources, namely the base vocabulary-contract, and no client-supplied interface data in stored in the resource-description (because the vocabulary access methods are defined by the core). Note that the core-supplied base contract-contract and base vocabulary-contract classes provide, in some embodiments, a uniform set of methods for accessing contract and vocabulary resources.

Resource Discovery

The distributed resource typing mechanism of the present invention includes, according to some embodiments, the resource as a discoverable entity. In particular, in some embodiments, each resource is typed with one or more vocabulary and contract services wherein each vocabulary and contract service is itself simultaneously a resource metadata item and an independently discoverable resource. This aspect of the typing mechanism—the discoverable nature of a resource typed by vocabularies and contracts which are themselves discoverable resources—may therefore in some embodiments include a robust attribute property grammar for describing resources. Thus, the distributed typing mechanism of the present invention includes, in some embodiments, effective discovery processes for services. For example, because the typing mechanism de-couples a service implementation from its associated vocabularies and contracts, and establishes the latter two as discoverable distributed entities, the discovery of resources (whether a service, vocabulary or contract) may be conducted efficiently in stages. In other words, in addition to traditional searching techniques where the service is directly targeted, a user may instead search initially for a vocabulary and/or contract used commonly in the service industry, and then, afterwards, use the resulting vocabulary and/or contract information to more quickly and accurately pinpoint an acceptable service. Related to this is the ability to independently advertise and develop industry standard (popular) vocabularies and standard contracts—in short, establish markets for vocabularies and contracts—describing and implementing competing services. (Discussed in more detail in the next paragraph.) Further related to this is the In addition, it enables service providers to specialize in the various aspects of service development and delivery (e.g., service providers may specialize in the delivery of service implementations, vocabularies or contracts). As a component of the discovery property of the typing mechanism, a robust attribute property grammar is supported—in some embodiments—for conducting finely-grained searches.

Figure 10:
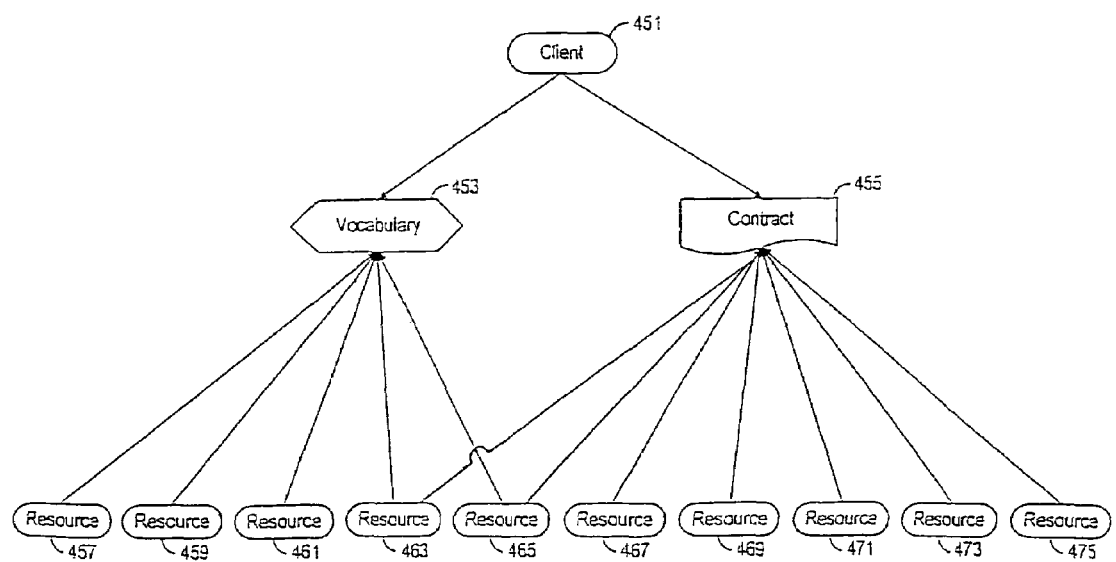
FIG. 10 is a block diagram illustrating how contract resources and vocabulary resources facilitate discovery between resource providers and resource users, according to one embodiment

The use of standard vocabularies and contracts is important in large markets because it creates an organizing principle for both service providers and users: providers may reach a wider customer base, and customers may more efficiently find suitable services. This situation is illustrated in FIG. 10, which is a block diagram illustrating how contract resources and vocabulary resources, especially if standard within an industry, may advantageously organize large markets of resource providers and resource users, and facilitate service discovery, according to one embodiment. FIG. 10 illustrates five resources 457 through 465, typically service resources, registered under vocabulary 453, and seven resources registered under contract 455. If vocabulary 453 and contract 455 were, however, standard contracts within a vertical market, fifty to a hundred (or more) competing resources may be registered and thus typed under either vocabulary 453 or contract 455, or both; however, for illustrative purposes only, a smaller number of resources 457 through 475 is shown in FIG. 10. In FIG. 10, resources 457 through 465 are shown typed by vocabulary 453; in addition, resources 463 through 475 are typed under contracts 455. Thus, resource 463 and 465 are typed under both vocabulary 453 and contract 455. Because in the typing system of the present invention, vocabulary and contract 453 and 455 are discoverable resources, a client searching for a particular type of service well-known in an industry may likely know the one or more standard vocabularies or interfaces known to be used in the industry. In this case, the client in a large market may more effectively locate an appropriate service by immediately narrowing his search of the universe of resources to the subset of those typed with the particular standard (or popular) contract or vocabulary, e.g., 455 and 453. Thus, for example, if the client 451 knows that vocabulary 453 is used to describe resources in the industry, the client 451 may then narrow the domain of resources to be searched to those typed by vocabulary 453, e.g., resources 457 through 465 The client 451 then formulates a query using the attribute properties defined in the vocabulary 453 for matching purposes against the resource descriptions of resources 457 through 465. As a result, the use of vocabulary and contract resources, e.g., 453 and 355, provides an organizing tool enabling resource users and providers to more effectively reach one another over a computer network. In some embodiments, as FIG. 10 illustrates, the client may know both the vocabulary 453 and the contract 455 for the resource it is seeking; in this situation, the client may then even more efficiently limit its initial search to a narrower range of resources typed against both vocabulary 453 and contract 455, i.e., resources 463 and 465. In yet other embodiments, if the client does not know the standard vocabulary 453 or contract 455 some embodiments, the client may first direct a query to locate the standard vocabulary 453 or contract 455, and then-use the resulting discovered vocabularies or contracts to formulate a second query (of resources typed by them) as described above. In this case, the searching process for the resource is performed in stages, i.e., locate a relevant vocabulary or contract for the desired service first, then use the discovered vocabulary and/or contract to form more specific queries of smaller resource domains (i.e., the domain of resources typed by the discovered vocabulary and/or resource).

Figure 11A:
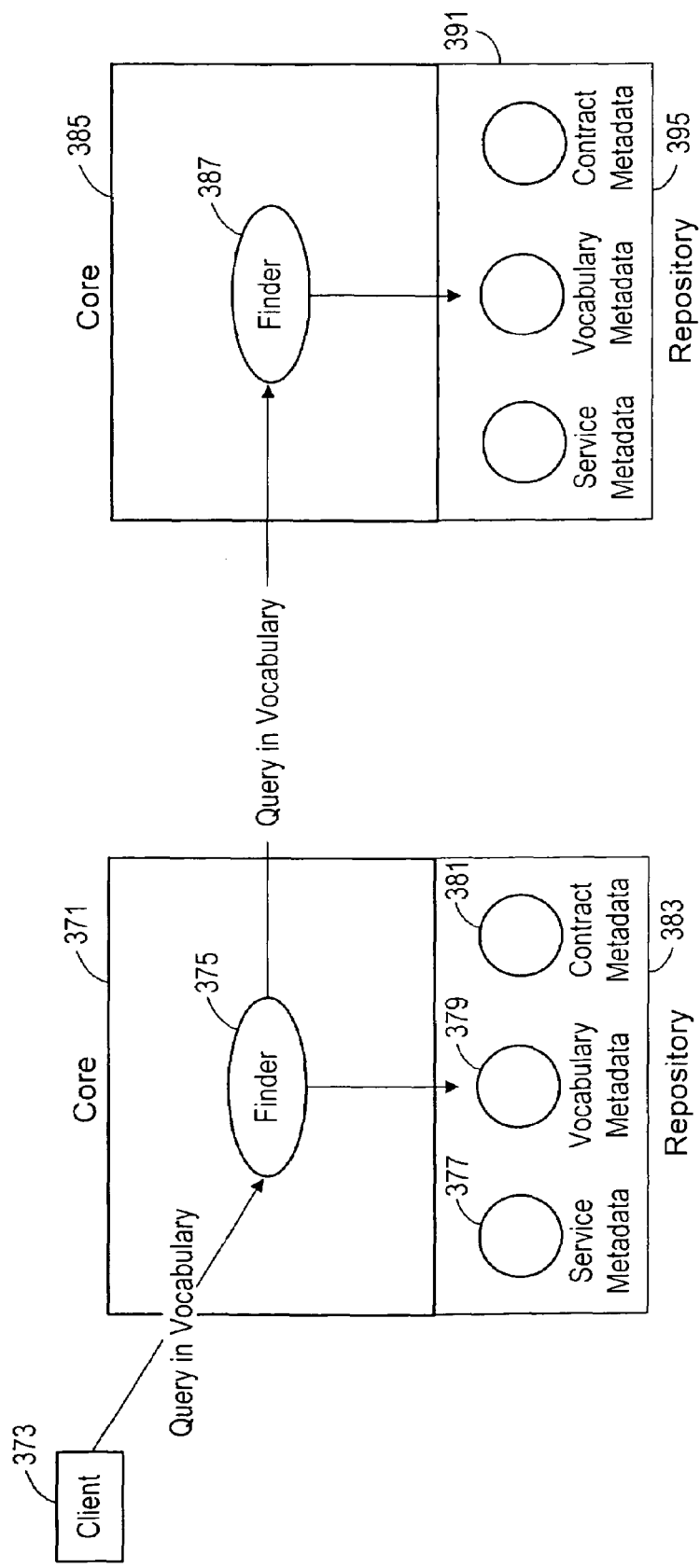
FIG. 11A is a block diagram providing an overview of local and remote resource discovery, according to some embodiments.

FIG. 11A is a block diagram providing an overview of local and remote resource discovery, according to some embodiments. In FIG. 11A, each core, e.g., local core 371 and remote core 385, supply core-managed finder classes 375 based on the resource type, e.g., service finder, vocabulary finder, and contract finder (finders for other classes of resources are also available). (Note that only two cores are shown for purposes of simplicity, and that millions of cores could be interconnected.) Each finder service—e.g., whether a service, vocabulary, or contract finder service—searches exclusively within the respective category of metadata stored in the repository—e.g., a vocabulary finder searches vocabulary metadata, but not service or contract metadata. In some embodiments, the local finder service 375 first receives an attribute query from user 373 in one or more vocabularies used by the service provider to describe the desired resource. The local finder service 375 then searches the particular category of metadata, e.g., either 377, 379 or 381, in the repository 383. In particular, the finder applies the query to the relevant attribute sets in the metadata resource descriptions (e.g., 201, 203, and 205 in FIG. 8A). If the finder 375 finds a matching resource, the finder may, as provided by the user, return, e.g., a reference to the resource, an interface to the resource, or a stub class for invoking the resource. If the finder does not find a match in the local repository, it may send the search query to one or more remote cores, e.g., 385, connected to and known by the local core 371. The finder, e.g., 387, on the remote core, e.g., 385, will then search its repository, e.g., 391, in the same manner as the search performed on the local repository 383. In this manner, the user will eventually discover the stub class for an acceptable service and invoke methods on the stub using the customary programming techniques for invoking objects in the local address space (thus, in some embodiments, "virtualizing" the distributed resources).

Figure 11B:
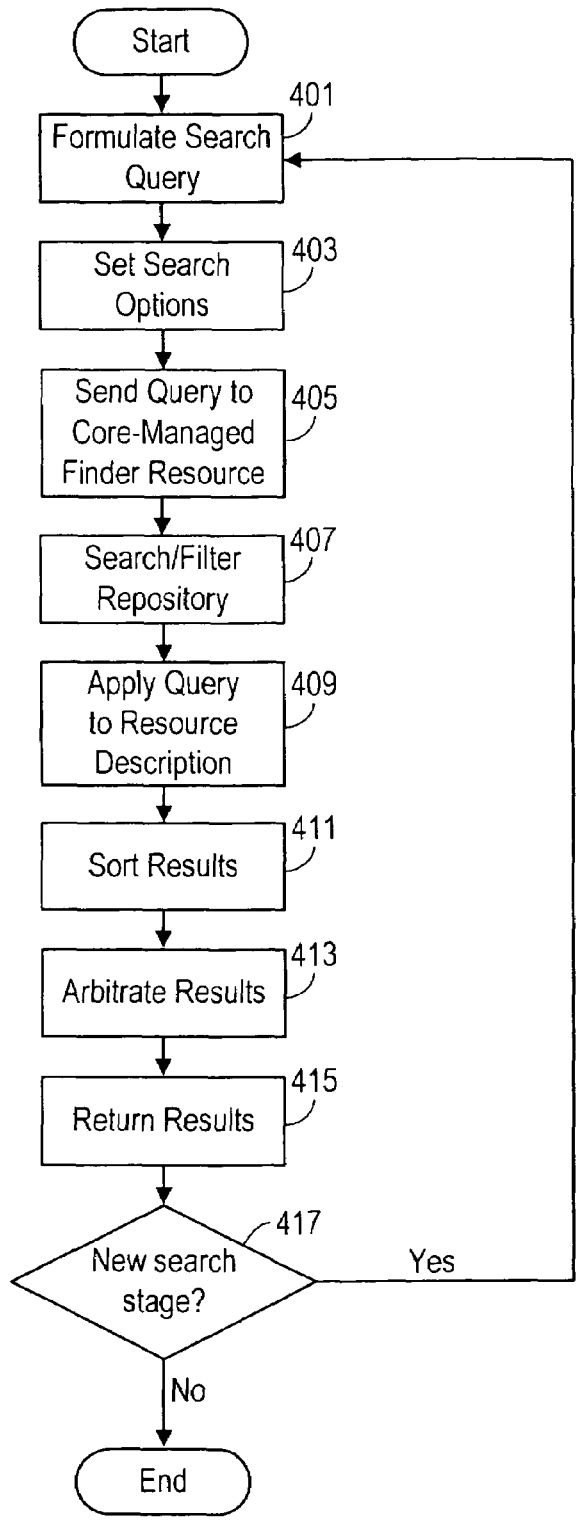
FIG. 11B is a flow diagram illustrating the stages for discovering a resource (e.g., service, vocabulary, and contract), according to some embodiments.

FIG. 11B is a flow diagram illustrating the stages for discovering a resource (e.g., service, vocabulary, and contract), according to some embodiments. In stage 401, the user formulates a search recipe using attributes from one or more vocabularies in which the desired service is advertised. A search recipe is an expression of attributes a service must have to satisfy a user's needs. A user may construct a search recipe in some embodiments, by specifying one or more vocabularies defining the attributes used in the search recipe, a constraint stringy, an optional list of preferences, an optional arbitration value, and an optional repository view. As described above in reference to FIG. 8D, vocabularies and associated attribute set classes support a wide variety of data types and corresponding matching rules and operations. For example, arithmetic operations may be performed on an integer attribute as well as relational matching rules, such as greater than, less than, and equal to; likewise, character attributes may be concatenated and compared for equality. This provides a flexible foundation to support useful querying grammars. In some embodiments, for example, the user may formulate complex string queries, or "constraints," using attribute values, relational and logical operators, which must be satisfied by the corresponding attributes in the metadata resource description. In some embodiments, the constraint may be formulated in a syntax similar to the OMG's OTS specification (Object Management Group's Object Transaction Service specification). In one embodiment, a constraint syntax is parsed as if it were a disjunction of conjunctions, i.e., the constraint expression is expected to be in disjunctive normal form. In addition to the constraint, the user may specify a preference list, an arbitration value and a repository view. If more than one service satisfies a search recipe, a preference list may used in some embodiments to rank the services in order of acceptability. The preference list enables the user to provide relative weighting to attributes, so that services may be ranked on the basis of the weighted attributes. In some embodiments, the user may provide an arbitration value used to specify whether the highest ranked service, or all services, should be returned to the user. In some embodiments, the user may specify a repository view restricting the scope of the search to repository metadata contained with the view.

In stage 403, the user may set various search options to control the manner of the search, and what results the search should return. For example, in some embodiments, the user may: specify that the first match should be returned; place an upper limit of the number of matches to be returned; limit searching to the local core or one or more remote cores; specify an interface to be searched for, in which case an introspection request is sent to the services, and only services up and running are returned by the search. In stage 405, the user sends the search recipe to the finder service in the local core. In stage 407, the finder service searches the metadata in the core. In stage 409, the finder service filters the metadata by applying the search recipe to the attribute sets in the resource descriptions for determining which attribute sets have attribute configurations satisfying the constraints defined by the search recipe. In stage 411, if more than metadata (corresponding to a single resource) is found to satisfy a search recipe, then the infrastructure determines whether the user has provided a preference list. If the user has provided a preference list, then set of matching services is sorted based upon the user-defined preferences. In stage 413, if the user has provided an arbitration value, then either the highest ranking service from the sorted set, or the set of sorted resources itself, is returned to the user depending upon the arbitration value, according to some embodiments. In stage 415, resulting information about matching services, if any, are returned to the user. In some embodiments, the finder may return to the user one or more of the following: a reference to the service, one or more interfaces to the service, one or more stubs to the service. In stage 417, if the search is to be performed in stages, then the search stages are repeated for the next search. Thus, a client may perform more efficient searches if it searches in the following order: first, the client performs a query search for a standard or popular vocabulary or contract resource to which the desired service may be typed; and then second, the client uses the results to frame more accurate attribute-based queries (using, e.g., attributes as defined by the discovered standard vocabulary resource, and specifying an interface as defined by the discovered contract resource) to a narrower domain of services typed by the discovered vocabulary and/or contract resources discovered in the first stage.

Although particular embodiments of the present invention have been shown and described, it will be obvious to one skilled in the art that changes and modifications may be made without departing from the present invention in its broader aspects, and therefore, the appended claims are to encompass within their scope all such changes and modifications that fall within the true scope of the present invention.

We claim:

1. A method of discovering one or more target resources in a distributed system executable over two or more computers interconnected by a computer network, the distributed system including an infrastructure executable on each computer connecting the resources, the resources including service, vocabulary and contract resources, the method comprising:
   receiving a search request for the target resources from a client, including a target description describing the target resources;
   searching a database of resource information, wherein the resource information includes:
      one or more resource descriptions describing associated resources, explanatory information explaining the resource descriptions, and access data, including interface data, for accessing the associated resource;
   determining whether one or more resource descriptions match the target description; and
   sending result information about matching resources to the client.

2. The method of claim 1, wherein the request is received from a locally connected client.

3. The method of claim 1, wherein the request is received from a remote computer over the computer network.

4. The method of claim 1, wherein:
   the target description includes a reference to the target resource.

5. The method of claim 1, wherein:
   the target description includes target attributes describing the target resources; the resource descriptions include resource attributes describing the resources; and
   determining whether one or more resource descriptions match the target description includes comparing the attributes in the target description with the attributes in the resource descriptions.

6. The method of claim 5, wherein:
   the target description includes a query describing a relationship among the attributes; and
   determining whether one or more resource descriptions match the target description includes comparing the relationship among attributes described by the query with the relationship among attributes described in the resource descriptions.

7. The method of claim 1, further comprising:
   if the target description includes a reference to a contract resource to which the target resources are typed, then searching only resource information in the database typed to the contract resource.

8. The method of claim 1, further comprising:
   if the target description includes a reference to a vocabulary resource to which the target resources are typed, then searching only resource information in the database typed to the vocabulary resource.

9. The method of claim 1, wherein:
   if the target description includes a reference to a vocabulary resource and to a contract resource to which the target resources are typed, then searching only resource information in the database typed to the vocabulary resource and the contract resource.

10. The method of claim 1, wherein the result information includes references to the matching resources.

11. The method of claim 10, wherein the references include URLs to the matching resources.

12. The method of claim 1, wherein the result includes interface data for accessing the matching resources.

13. The method of claim 12, wherein the interface data includes the set of IDL interfaces supported by each matching resource.

14. The method of claim 12, wherein the interface data includes stub classes for invoking methods on the matching resources.

15. A computer system for discovering one or more target resources in a distributed system executable over two or more computers interconnected by a computer network, the distributed system including an infrastructure executable on each computer connecting the resources, the resources including service, vocabulary and contract resources, the computer system comprising:
   at least two computers connected over the computer network; and
   a computer program executable on each computer generating processes accessible to at least one other computer over the computer network;
   wherein the computer programs further comprises computer instructions for:
      receiving a search request for the target resources from a client, including a target description describing the target resources;
      searching a database of resource information, wherein the resource information includes:
         one or more resource descriptions describing associated resources, explanatory information explaining the resource descriptions, and access data, including interface data, for accessing the associated resource;
      determining whether one or more resource descriptions match the target description; and
      sending result information about matching resources to the client.

16. The computer system of claim 15, wherein the request is received from a locally connected client.

17. The computer system of claim 15, wherein the request is received from a remote computer over the computer network.

18. The computer system of claim 15, wherein:
the target description includes a reference to the target resource.

19. The computer system of claim 15, wherein:
the target description includes target attributes describing the target resources; the resource descriptions include resource attributes describing the resources; and
determining whether one or more resource descriptions match the target description includes comparing the attributes in the target description with the attributes in the resource descriptions.

20. The computer system of claim 19, wherein:
the target description includes a query describing a relationship among the attributes; and
determining whether one or more resource descriptions match the target description includes comparing the relationship among attributes described by the query with the relationship among attributes described in the resource descriptions.

21. The computer system of claim 15, wherein the computer program further comprises computer instructions for:
if the target description includes a reference to a contract resource to which the target resources are typed, then searching only resource information in the database typed to the contract resource.

22. The computer system of claim 15, wherein the computer program further comprises computer instructions for:
if the target description includes a reference to a vocabulary resource to which the target resources are typed, then searching only resource information in the database typed to the vocabulary resource.

23. The computer system of claim 15, wherein:
if the target description includes a reference to a vocabulary resource and to a contract resource to which the target resources are typed, then searching only resource information in the database typed to the vocabulary resource and the contract resource.

24. The computer system of claim 15, wherein the result information includes references to the matching resources.

25. The computer system of claim 24, wherein the references include URLs to the matching resources.

26. The computer system of claim 15, wherein the result includes interface data for accessing the matching resources.

27. The computer system of claim 26, wherein the interface data includes the set of IDL interfaces supported by each matching resource.

28. The computer system of claim 26, wherein the interface data includes stub classes for invoking methods on the matching resources.

29. A computer program product having a computer readable medium having computer program logic recorded thereon for discovering one or more target resources in a distributed system, the resources including service, vocabulary, and contract resources, the computer program product comprising:
code for receiving a search request for the target resources from a client, including a target description describing the target resources;
code for searching a database of resource information local to the client, wherein the resource information includes:
one or more resource descriptions describing associated resources, explanatory information explaining the resource descriptions, and access data, including interface data, for accessing the associated resource;
code for determining whether one or more resource descriptions match the target description;
code for sending a search query to one or more computers remote from the client if it is determined that the resource descriptions do not match the target description, wherein the search query requests searching one or more other databases of resource information located at each of the one or more computers remote from the client;
code for receiving responses to the search query from the one or more computers remote from the client; and
code for sending result information about matching resources to the client.

30. The computer program product of Clam 29, wherein the resource descriptions conform to an industry standard defining resource descriptions.

31. The computer program product of claim 29, wherein the request is received from a locally connected client.

32. The computer program product of claim 29, wherein the request is received from a second computer remote from the client.

33. The computer program product of claim 29, wherein:
the target description includes a reference to the target resource.

34. The computer program product of claim 29, wherein:
the target description includes target attributes describing the target resources; the resource descriptions include resource attributes describing the resources; and the code for determining whether one or more resource descriptions match the target description includes code for comparing the attributes in the target description with the attributes in the resource descriptions.

35. The computer program product of claim 34, wherein:
the target description includes a query describing a relationship among the attributes; and the code for determining whether one or more resource descriptions match the target description includes code for comparing the relationship among attributes described by the query with the relationship among attributes described in the resource descriptions.

36. The computer program product of claim 29, further comprising:
code for searching only resource information in the database typed to a particular contract resource if the target description includes a reference to the particular contract resource to which the target resources are typed.

37. The computer program product of claim 29, wherein the result information includes one or more of the following:
URLs to the matching resources;
stub classes for invoking methods on the matching resources; and
a set of IDL interfaces supported by each matching resource.

* * * * *

UNITED STATES PATENT AND TRADEMARK OFFICE
CERTIFICATE OF CORRECTION

PATENT NO. : 7,702,687 B2  Page 1 of 1
APPLICATION NO. : 11/141839
DATED : April 20, 2010
INVENTOR(S) : Kannan Govindarajan et al.

It is certified that error appears in the above-identified patent and that said Letters Patent is hereby corrected as shown below:

In column 22, line 20, in Claim 30, delete "Clam 29," and insert -- claim 29, -- therefor.

Signed and Sealed this

Thirtieth Day of November, 2010

David J. Kappos
*Director of the United States Patent and Trademark Office*